US012314619B2

(12) United States Patent
Lee et al.

(10) Patent No.: US 12,314,619 B2
(45) Date of Patent: May 27, 2025

(54) DISPLAY APPARATUS AND OPERATING METHOD OF THE DISPLAY APPARATUS

(71) Applicant: SAMSUNG ELECTRONICS CO., LTD., Suwon-si (KR)

(72) Inventors: Jongin Lee, Suwon-si (KR); Sehyun Kim, Suwon-si (KR); Hyeeun Park, Suwon-si (KR); Yongwoo Shin, Suwon-si (KR); Kilsoo Choi, Suwon-si (KR); Junyoung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/368,955

(22) Filed: Sep. 15, 2023

(65) Prior Publication Data

US 2024/0004600 A1    Jan. 4, 2024

Related U.S. Application Data

(63) Continuation of application No. PCT/KR2023/008976, filed on Jun. 27, 2023.

(30) Foreign Application Priority Data

Jun. 28, 2022  (KR) .................. 10-2022-0079239
Dec. 5, 2022   (KR) .................. 10-2022-0168095

(51) Int. Cl.
*G06F 3/14* (2006.01)
*G06F 3/01* (2006.01)
(Continued)

(52) U.S. Cl.
CPC ............ *G06F 3/14* (2013.01); *G06F 3/011* (2013.01); *G06F 3/0482* (2013.01); *G06F 3/04847* (2013.01)

(58) Field of Classification Search
CPC ...................................................... A63F 13/35
See application file for complete search history.

(56) References Cited

U.S. PATENT DOCUMENTS 10,453,331 B2    10/2019   Su et al.
2016/0140960 A1   5/2016   Chae
(Continued)

FOREIGN PATENT DOCUMENTS

CN    106416143 A    2/2017
CN    113398581 A    9/2021
(Continued)

OTHER PUBLICATIONS

Website, "How to use Samsung Smart TV Gaming Hub in 2022", Samsung Electronics Service Co., Ltd., Jun. 24, 2022, 13 total pages, https://www.samsungsvc.co.kr/solution/1010881.
(Continued)

*Primary Examiner* — Nan-Ying Yang
(74) *Attorney, Agent, or Firm* — Sughrue Mion, PLLC

(57) ABSTRACT

Provided are a display apparatus and an operating method of the display apparatus. The display apparatus includes: a communication interface; a display; a memory storing at least one instruction; and at least one processor configured to execute the at least one instruction to: receive, through the communication interface, from a server apparatus, a first execution result content obtained by executing a contents application based on an input signal from an external device connected to the server apparatus and configured to provide the input signal to the server apparatus, control the display to display the first execution result content, receive, through the communication interface, from the server apparatus, a first input signal indicating a specified value, the first input signal being transmitted from the controller to the server apparatus, based on the first input signal indicating the specified value, display, through the display, a user interface
(Continued)

screen to control the display apparatus, receive, through the communication interface while the display is displaying the user interface screen, a second input signal from the external device, control the displayed user interface screen, based on the second input signal, and perform an operation based on the control of the displayed user interface screen.

13 Claims, 18 Drawing Sheets

(51) Int. Cl.
  *G06F 3/0482* (2013.01)
  *G06F 3/04847* (2022.01)

(56) References Cited

U.S. PATENT DOCUMENTS

| | | |
|---|---|---|
| 2016/0269677 A1 | 9/2016 | Lee et al. |
| 2016/0337712 A1 | 11/2016 | An et al. |
| 2019/0321732 A1* | 10/2019 | Zimring ................ A63F 13/235 |
| 2021/0113927 A1 | 4/2021 | Zimring et al. |
| 2022/0347584 A1 | 11/2022 | Zimring et al. |
| 2023/0048793 A1 | 2/2023 | Lee et al. |
| 2023/0118698 A1 | 4/2023 | Choi et al. |

FOREIGN PATENT DOCUMENTS

| | | |
|---|---|---|
| EP | 4013527 A1 | 9/2021 |
| KR | 10-2016-0110004 A | 9/2016 |
| KR | 10-2016-0134355 A | 11/2016 |
| KR | 10-2020-0135866 A | 12/2020 |
| KR | 10-2021-0028376 A | 3/2021 |
| KR | 10-2021-0112278 A | 9/2021 |
| KR | 10-2021-0157142 A | 12/2021 |
| WO | 2021/183158 A1 | 9/2021 |
| WO | 2023/017989 A1 | 2/2023 |

OTHER PUBLICATIONS

International Search Report and Written Opinion (PCT/ISA/220, PCT/ISA/210, and PCT/ISA/237) dated Oct. 18, 2023, issued by International Searching Authority for International Application No. PCT/KR2023/008976.

* cited by examiner

FIG. 5

CONTROLLER INPUT SIGNAL–DISPLAY APPARATUS
CONTROL SIGNAL CONVERSION TABLE ⟵ 500

| CONTROLLER INPUT SIGNAL | DISPLAY APPARATUS CONTROL SIGNAL |
|---|---|
| aaa1 | d1 |
| aaa2 | d2 |
| aaa3 | d3 |
| aaa4 | d4 |
| aaa5 | d5 |
| aaa6 | d6 | aaa1 / d1 row ← CONTROL SIGNAL INDICATING SPECIFIED VALUE

DISPLAY APPARATUS AND OPERATING METHOD OF THE DISPLAY APPARATUS

CROSS-REFERENCE TO RELATED APPLICATIONS

This application is a bypass continuation of PCT International Application No. PCT/KR2023/008976, which was filed on Jun. 27, 2023, and claims priority to Korean Patent Application No. 10-2022-0079239, filed on Jun. 28, 2022, and Korean Patent Application No. 10-2022-0168095, filed on Dec. 5, 2022, in the Korean Intellectual Property Office, the disclosures of which are incorporated herein by reference in their entireties.

BACKGROUND

1. Field

The disclosure relates to a display apparatus and a method of operating the display apparatus, and more particularly, to a display apparatus using a server apparatus and a controller, and an operating method thereof.

2. Description of Related Art

Recently, the number of game users has increased, and demand to enjoy game content via a large-screen television (TV) for immersion of games has increased.

Cloud gaming refers to a game service in which main computations such as graphics processing for a game are performed in a cloud server apparatus, operation inputs from a user are transmitted from a user apparatus such as a smartphone or a smart TV to the server apparatus, and the user apparatus receives and displays a rendered game screen by Internet Protocol (IP)-streaming.

SUMMARY

According to an aspect of the disclosure, a display apparatus includes: a communication interface; a display; a memory storing at least one instruction; and at least one processor configured to execute the at least one instruction.

The at least one processor may be configured to execute the at least one instruction to: receive, through the communication interface, from a server apparatus, a first execution result content obtained by executing a contents application based on an input signal from an external device connected to the server apparatus and configured to provide the input signal to the server apparatus.

The at least one processor may be further configured to execute the at least one instruction to: control the display to display the first execution result content.

The at least one processor may be further configured to execute the at least one instruction to: receive, through the communication interface, from the server apparatus, a first input signal indicating a specified value, the first input signal being transmitted from the external device to the server apparatus.

The at least one processor may be further configured to execute the at least one instruction to: based on the first input signal indicating the specified value, display, through the display, a user interface screen to control the display apparatus.

The at least one processor may be further configured to execute the at least one instruction to: receive, through the communication interface while the display is displaying the user interface screen, a second input signal from the external device.

The at least one processor may be further configured to execute the at least one instruction to: control the displayed user interface screen, based on the second input signal.

The at least one processor may be further configured to execute the at least one instruction to: perform an operation based on the control of the displayed user interface screen.

The at least one processor may be further configured to execute the at least one instruction to: receive, through the communication interface, the second input signal from the external device via the server apparatus, or receive, through the communication interface, the second input signal directly from the external device.

The at least one processor may be further configured to execute the at least one instruction to: control the display to end displaying of the user interface screen, based on the second input signal indicating to end displaying of the user interface screen, control the communication interface to transmit, to the server apparatus, a signal indicating that the display apparatus is in a contents reproduction control mode, based on the display ending displaying of the user interface screen.

The at least one processor may be further configured to execute the at least one instruction to receive, through the communication interface, from the server apparatus, a second execution result content obtained by executing the contents application according to a third input signal from the external device that is received after transmitting the signal indicating that the display apparatus is in the contents reproduction control mode.

The at least one processor may be further configured to execute the at least one instruction to: identify whether a type of the contents application is a specified type, and control the communication interface, to the server apparatus, a list including at least one input signal that indicates the specified value, based on the type of the contents application being the specified type.

The at least one processor may be further configured to execute the at least one instruction to: identify whether a type of the contents application is a specified type, and based on the type of the contents application being the specified type, transmit, through the communication interface, to the external device, information to allow the external device to be directly connected to the server apparatus, and a command to the server apparatus.

According to an aspect of the disclosure, a server apparatus includes: a communication interface; a memory storing at least one instruction; and at least one processor configured to execute the at least one instruction to: control the communication interface to transmit, to a display apparatus, a first execution result content obtained by executing a contents application, receive, through the communication interface, a first input signal from an external device, identify whether the first input signal indicates a specified value, based on identifying that the first input signal indicates the specified value, control the communication interface to transmit, to the display apparatus, the first input signal to allow the display apparatus to output a user interface screen, and based on identifying that the first input signal does not indicate the specified value, control the communication interface to transmit, to the display apparatus, a second execution result content obtained by executing the contents application according to the first input signal.

The at least one processor may be further configured to execute the at least one instruction to, based on identifying that the display apparatus is in a menu mode of outputting the user interface screen, transmit, through the communication interface, to the display apparatus, a second input signal received from the external device.

The at least one processor may be further configured to execute the at least one instruction to: receive, through the communication interface, from the display apparatus while the display apparatus is in a menu mode, a signal indicating that the display apparatus is in a contents reproduction control mode, identify that the display apparatus is in the contents reproduction control mode, based on the signal indicating that the display apparatus is in the contents reproduction control mode, and based on identifying that the display apparatus is in the contents reproduction control mode, transmit to the display apparatus, through the communication interface, a third execution result content, the third execution result content being obtained by executing the contents application based on a second input signal from the external device.

The at least one processor may be further configured to execute the at least one instruction to: receive, from the display apparatus through the communication interface, a list including at least one input signal that indicates the specified value, and store the list.

According to an aspect of the disclosure, a method of operating a display apparatus, includes: receiving, from a server apparatus, a first execution result content obtained by executing a contents application based on an input signal from an external device connected to the server apparatus and configured to provide the input signal to the server apparatus; displaying the first execution result content on a display of the display apparatus; receiving, from the server apparatus, a first input signal indicating a specified value, the first input signal being transmitted from the external device to the server apparatus; based on the first input signal indicating the specified value being received, displaying a user interface screen to control of the display apparatus; receiving while the display apparatus is displaying the user interface screen, a second input signal from the external device; controlling the displayed user interface screen based on the second input signal; and performing an operation based on the control of the displayed user interface.

The receiving the second input signal from the external device may include: receiving the second input signal from the external device via the server apparatus; or receiving the second input signal directly from the external device.

The method may further include: based on the second input signal indicating to end displaying of the user interface screen, controlling the display to end displaying of the user interface screen; and transmitting, to the server apparatus, a signal indicating that the display apparatus is in a contents reproduction control mode, based on the display ending displaying of the user interface screen.

The method may further include receiving, from the server apparatus, a second execution result content obtained by executing the contents application according to a third input signal from the external device that is received after transmitting the signal indicating that the display apparatus is in the contents reproduction control mode.

The method may further include identifying whether a type of the contents application is a specified type; and transmitting, to the server apparatus, a list including at least one input signal that indicates the specified value, based on the type of the contents application being the specified type.

The method may further include: identifying whether a type of the contents application is a specified type; and based on the type of the contents application being the specified type, transmitting, to the external device, information to allow the external device to be directly connected to the server apparatus, and a command to instruct the external device to connect to the server apparatus.

According to an aspect of the disclosure, a method of operating a server apparatus, includes: transmitting, to a display apparatus, a first execution result content obtained by executing a contents application; receiving a first input signal from an external device; identifying whether the first input signal indicates a specified value; based on identifying that the first input signal indicates the specified value, transmitting the first input signal to the display apparatus, to allow the display apparatus to output a user interface screen; and based on identifying that the first input signal does not indicate the specified value, transmitting, to the display apparatus, a second execution result content obtained by executing the contents application, according to the first input signal.

The method may further include, based on identifying that the display apparatus is in a menu mode of outputting the user interface screen, transmitting, to the display apparatus, a second input signal received from the external device.

The method may further include: receiving, from the display apparatus while the display apparatus is in a menu mode, a signal indicating that the display apparatus is in a contents reproduction control mode; identifying that the display apparatus is in the contents reproduction control mode, based on the signal indicating that the display apparatus is in the contents reproduction control mode; and based on identifying that the display apparatus is in the contents reproduction control mode, transmitting a third execution result content to the display apparatus, the third execution result content being obtained by executing the contents application based on a second input signal from the external device.

According to an aspect of the disclosure, a non-transitory computer readable medium stores computer readable program code or instructions which are executable by at least one processor to perform a method of operating a display apparatus, the method including: receiving, from a server apparatus, a first execution result content obtained by executing a contents application based on an input signal from a external device, wherein the external device is connected to the server apparatus and configured to provide the input signal to the server apparatus; displaying the first execution result content; receiving, from the server apparatus, a first input signal indicating a specified value, the first input signal being transmitted from the external device to the server apparatus based on the first input signal indicating the specified value being received, displaying a user interface screen to control of the display apparatus; receiving while the display apparatus is displaying the user interface screen, a second input signal from the external device; controlling the displayed user interface screen based on the second input signal; and performing an operation based on the control of the displayed user interface.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 illustrates a table for conversion of a controller input signal into a display apparatus control signal, according to an embodiment;

DETAILED DESCRIPTION

Figure 1:
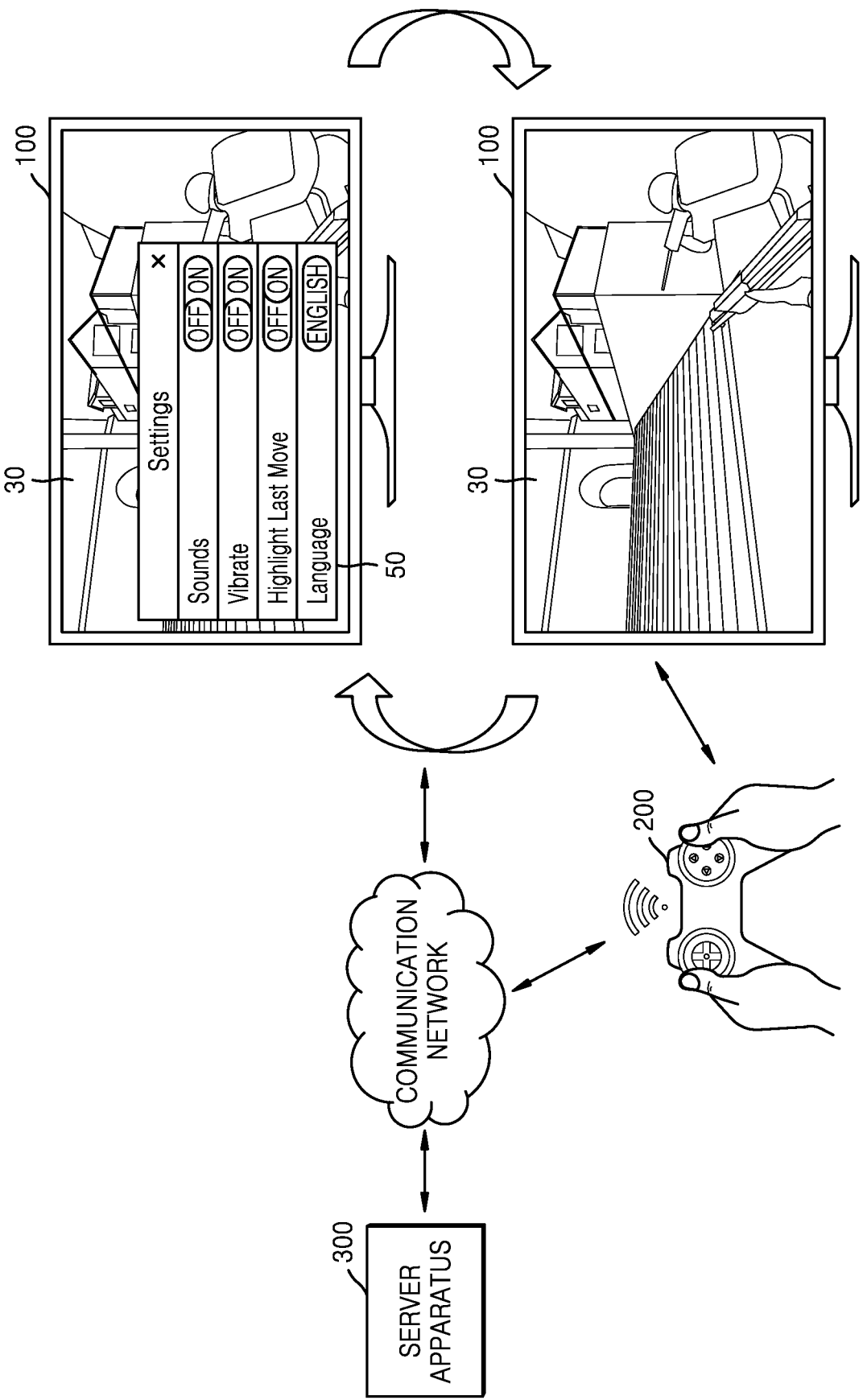
FIG. 1 illustrates an operation of a server apparatus and a display apparatus according to an embodiment.

Throughout the disclosure, the expression "at least one of a, b, or c" indicates only a, only b, only c, both a and b, both a and c, both b and c, or all of a, b, and c.

The terms used in the disclosure will be briefly defined, and example embodiments of the disclosure will be described in detail.

All terms including descriptive or technical terms which are used in the disclosure should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

Throughout the specification, when a part "includes" or "comprises" an element, unless there is a particular description contrary thereto, the part may further include other elements, not excluding the other elements. As used in the disclosure, the term "unit" or "module" denotes an entity for performing at least one function or operation, and may be implemented as hardware, software, or a combination of hardware and software.

The embodiments herein and the various features and advantageous details thereof are explained more fully with reference to the non-limiting embodiments that are illustrated in the accompanying drawings and detailed in the following description, where similar reference characters denote corresponding features consistently throughout. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As used herein, the term "user" refers to a person, which controls functions or operations of a computing device or an electronic device by using a control device, and may include a viewer, a manager, or an installation engineer.

FIG. 1 illustrates an operation of a server apparatus and a display apparatus according to an embodiment.

Referring to FIG. 1, a server apparatus 300 may execute a contents application, in response to a request from a display apparatus 100, and may transmit a result screen according to execution of the contents application to the display apparatus 100 via a communication network. For example, when the server apparatus 300 receives an execution request for a game application from the display apparatus 100, the server apparatus 300 may execute the game application and may transmit a result screen or a result image rendered according to execution of the game application to the display apparatus 100 via a communication network.

The display apparatus 100 may transmit an execution request for a contents application to the server apparatus 300, may receive, from the server apparatus 300, a result screen 30 according to execution of the contents application in response to the execution request, and may display the received result screen 30 on a display thereof.

The controller 200 may transmit an operation command for controlling application execution result content displayed on the display apparatus 100, to the server apparatus 300 via a communication network or directly to the display apparatus 100. In particular, the controller 200, according to an embodiment, may communicate with the server apparatus 300 by using the Internet network, thereby transmitting, to the server apparatus 300, the operation command according to user operation input to the controller 200. A user may operate the controller 200 to control displayed contents while viewing the contents displayed on the display apparatus 100, and the controller 200 may transmit the operation command according to the user operation to the server apparatus 300. The server apparatus 300 may execute an application according to a content operation command received from the controller 200, and may transmit application execution result content to the display apparatus 100.

In this manner, an operation command from the controller 200 is not transferred to the server apparatus 300 via the display apparatus 100 but is directly transmitted to the server apparatus 300, such that a control of content may be further rapidly performed.

In this manner, in a situation where the controller 200 is directly connected to the server apparatus 300 and transmits an operation command, when a menu for controlling the display apparatus 100 is executed in the display apparatus 100, a problem as to how the display apparatus 100 is controlled may occur. For example, there may be a situation in which a user desires to control the display apparatus 100 while the user views and controls content by using the display apparatus 100. For example, when the user wants to raise the volume of the display apparatus 100 or to adjust a brightness of a screen of the display apparatus 100 while the user plays game content via the display apparatus 100, the display apparatus 100 may operate in a menu mode for control of the display apparatus 100. Here, in an environment where the controller 200 operates to transmit an operation command to the server apparatus 300 and the server apparatus 300 operates to transmit an application execution result corresponding to the operation command to the display apparatus 100, the display apparatus 100 does not directly receive an input signal from the controller 200. Therefore, there may be a demand for a scheme by which the display apparatus 100 can receive a control signal for control of the display apparatus 100 in the menu mode.

According to an embodiment, the display apparatus 100 may inform the server apparatus 300 of information about an input signal having a specified value from among input signals being used by the controller 200, and the server apparatus 300 may identify the input signal having the specified value from among input signals received from the controller 200 and may allow the display apparatus 100 to operate in a menu mode, based on the input signal. That is, when it is not the input signal having the specified value, the server apparatus 300 may execute the contents application based on the input signal from the controller 200, and may transmit execution result content to the display apparatus 100. On the other hand, when the server apparatus 300 receives the input signal having the specified value from the controller 200, the server apparatus 300 may changelessly transmit the received input signal to the display apparatus 100. Then, based on the input signal having the specified value being received, the display apparatus 100 may display, on the display, a user interface screen 50 for control of the display apparatus 100 to operate in the menu mode.

According to an embodiment, the display apparatus 100 may receive an input signal from the controller 200 via the server apparatus 300 while the user interface screen 50 for control of the display apparatus 100 is displayed (menu mode), and may perform control of the display apparatus 100, based on the received input signal.

According to an embodiment, while the user interface screen 50 for control of the display apparatus 100 is displayed (menu mode), the display apparatus 100 may send, to the controller 200, a control command indicating to directly transmit an input signal from the controller 200 to the display apparatus 100, may directly receive the input signal from the controller 200, and thus, may perform control of the display apparatus 100.

According to an embodiment, as the display apparatus 100 detects an end of the menu mode, that is, an end of the user interface screen 50, the display apparatus 100 may transmit information indicating the end of the menu mode to the server apparatus 300, thereby controlling the server apparatus 300 to execute the contents application, based on an input signal being received from the controller 200, and to transmit execution result content.

According to an embodiment, as the display apparatus 100 detects an end of the menu mode, that is, an end of the user interface screen 50, the display apparatus 100 may transmit information indicating the end of the menu mode to the controller 200, thereby controlling the controller 200 to transmit an input signal from the controller 200 to the server apparatus 300.

Figure 2:
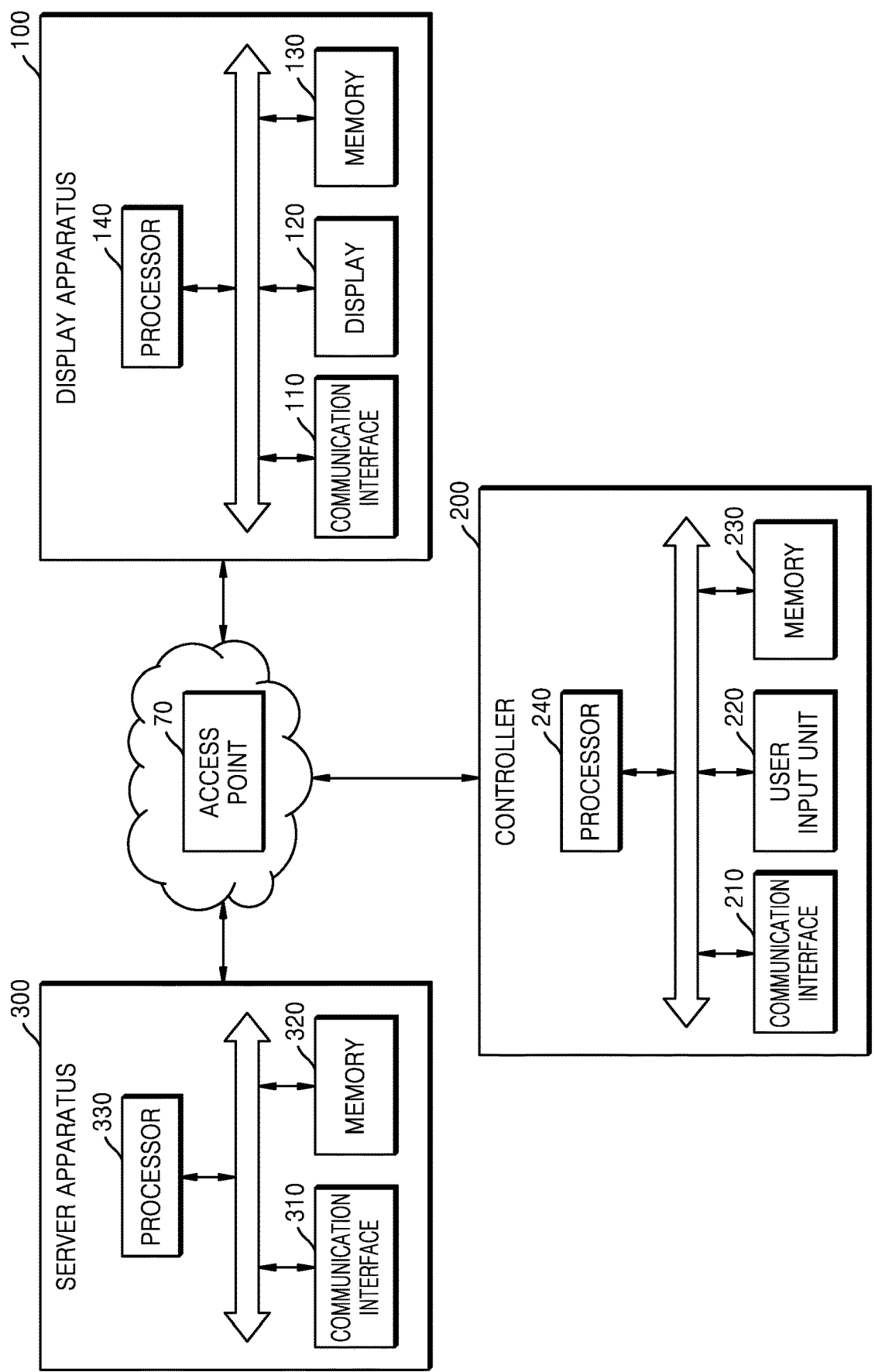
FIG. 2 illustrates a system including a display apparatus, a controller, and a server apparatus, according to an embodiment.

FIG. 2 illustrates a system including a display apparatus, a controller, and a server apparatus, according to an embodiment.

Referring to FIG. 2, the system may include the display apparatus 100, the controller 200, and the server apparatus 300.

The display apparatus 100 is an apparatus capable of displaying an image or data, in response to a user request, and may include a communication interface 110, a display 120, a memory 130, and a processor 140.

The communication interface 110 may include at least one module for allowing wireless communication between the display apparatus 100 and a wireless communication system or between the display apparatus 100 and a network where other apparatus exists. The communication interface 110 according to an embodiment may perform communication with the controller 200, according to a short-range communication technology. The short-range communication technology may include Bluetooth communication, Wi-Fi communication, infrared communication, or the like. The communication interface 110 according to an embodiment may perform communication with the server apparatus 300, according to an Internet Protocol (IP).

The display 120 may output an image or data processed by the display apparatus 100.

The memory 130 may store a program for processing and controlling by the processor 140, and may store data input to the display apparatus 100 or output from the display apparatus 100. Also, the memory 130 may store a plurality of pieces of data requested for an operation of the display apparatus 100.

The memory 130 may include at least one type of storage medium from among flash memory, a hard disk, a multimedia card micro, a memory card (e.g., a secure digital (SD) or extreme digital (XD) memory card), random access memory (RAM), static random access memory (SRAM), read-only memory (ROM), electrically erasable programmable read-only memory (EEPROM), programmable read-only memory (PROM), magnetic memory, a magnetic disk, and an optical disc.

The processor 140 controls all operations of the display apparatus 100. For example, the processor 140 may execute at least one instruction stored in the memory 130 to perform functions of the display apparatus 100, according to an embodiment.

In an embodiment, the processor 140 may store at least one instruction in an internal memory, and may execute at least one instruction stored in the internal memory to control operations of a display apparatus to be performed. That is, the processor 140 may execute at least one instruction or program stored in the internal memory of the processor 140 or the memory 130 to perform a preset operation.

According to an embodiment, the processor 140 may execute at least one instruction stored in the memory 130 to perform an operation of the display apparatus 100 disclosed herein.

According to an embodiment, the processor 140 may execute at least one instruction stored in the memory 130 to control the communication interface to receive, from a server, execution result content obtained by executing a contents application, based on an input signal from a controller connected to the server and configured to provide the input signal.

According to an embodiment, the processor 140 may execute at least one instruction stored in the memory 130 to control the display to display the execution result content.

According to an embodiment, the processor 140 may execute at least one instruction stored in the memory 130 to control the communication interface to receive, from the server, an input signal indicating a specified value from the controller.

According to an embodiment, the processor 140 may execute at least one instruction stored in the memory 130 to display a user interface screen for controlling the display apparatus, based on receiving the input signal indicating the specified value.

According to an embodiment, the processor 140 may execute at least one instruction stored in the memory 130 to receive an input signal from the controller and perform an operation for controlling the display apparatus, based on the input signal, while the user interface screen is displayed.

According to an embodiment, the processor 140 may execute at least one instruction stored in the memory 130 to receive an input signal from the controller via the server or control the communication interface to directly receive the input signal from the controller, while the user interface screen is displayed.

According to an embodiment, the processor 140 may execute at least one instruction stored in the memory 130 to, while the user interface screen is displayed, control the display to end displaying of the user interface screen according to an input signal for ending the user interface screen.

According to an embodiment, the processor 140 may execute at least one instruction stored in the memory 130 to control the communication interface to transmit, to the server, a signal indicating that the display apparatus operates in a contents reproduction control mode, according to the ending of the user interface screen.

According to an embodiment, the processor 140 may execute at least one instruction stored in the memory 130 to control the communication interface to receive, from the server, execution result content obtained by executing the contents application, according to an input signal received from the controller in response to transmission of the signal indicating that the display apparatus operates in the contents reproduction control mode.

According to an embodiment, the processor 140 may execute at least one instruction stored in the memory 130 to identify whether a type of the contents application is a specified type.

According to an embodiment, the processor 140 may execute at least one instruction stored in the memory 130 to control the communication interface to transmit, to the server, a list including at least one input signal indicating the specified value, based on the type of the contents application being the specified type.

According to an embodiment, the processor 140 may execute at least one instruction stored in the memory 130 to identify whether a type of the contents application is a specified type, and based on the type of the contents application being the specified type, to transmit, to the controller, information for allowing the controller to be directly connected to the server and a command for controlling connection to the server.

The display apparatus 100 may be any apparatus including a processor and a memory to perform a function. The display apparatus 100 may be a stationary-type apparatus or a mobile-type apparatus. For example, the display apparatus 100 may refer to an apparatus with a display to display image content, video content, game content, graphic content, or the like. The display apparatus 100 may output or display an image or content received from the server apparatus 300. The display apparatus 100 may include various types of electronic apparatuses including a television (TV) such as a network TV, a smart TV, an Internet TV, a web TV, or an IPTV, a computer such as a desktop computer, a laptop computer, or a tablet computer, various smart devices such as a smartphone, a cellular phone, a game player, a music player, a video player, medical equipment, home appliances, or the like, which can receive and output content. The display apparatus 100 may be referred to as a display apparatus in that the display apparatus 100 receives and displays content, and may also be referred to as a content receiving apparatus, a sync apparatus, an electronic apparatus, a computing apparatus, or the like.

According to an embodiment, each element in the block diagram of the display apparatus 100, as shown in FIG. 2, may be integrated, added, or omitted according to the specification of the display apparatus 100 that is actually implemented. For example, two or more elements may be combined into a single component, or a single component may be split into two or more components when necessary. Functions performed in each block are intended to describe embodiments of the disclosure, and a specific operation or device related to the functions does not limit the scope of the disclosure.

Hereinafter, the controller 200 will now be described.

The controller 200 may include a communication interface 210, a user input unit 220, a memory 230, and a processor 240. However, the controller 200 may be embodied with more elements than the shown elements, and embodiments of the disclosure is not limited thereto.

The communication interface 210 may include at least one module for allowing wireless communication between the controller 200 and a wireless communication system or between the controller 200 and a network where other apparatus exists. The communication interface 210 according to an embodiment may perform communication with the display apparatus 100, according to a short-range communication technology. The short-range communication technology may include Bluetooth communication, Wi-Fi communication, infrared communication, or the like. The communication interface 210 according to an embodiment may perform communication with the server apparatus 300, according to an IP.

The user input unit 220 may be an interface means in any form capable of receiving a user input. For example, the user input unit 220 may include operation buttons provided at a portion of the controller 200 so as to receive a user input, a touch-sensitive display configured to detect a touch input, a microphone capable of receiving a speech utterance of a user, or the like.

The memory 230 may store a program for processing and controlling by the processor 240, and may store data input to the controller 200 or output from the controller 200.

The memory 230 may include at least one type of storage medium from among flash memory, a hard disk, a multimedia card micro, a memory card (e.g., a SD or XD memory card), RAM, SRAM, ROM, EEPROM, PROM, magnetic memory, a magnetic disk, and an optical disc.

The processor 240 controls all operations of the controller 200. For example, the processor 240 may execute at least one instruction stored in the memory 230 to perform a function of the controller 200, according to an embodiment.

In an embodiment, the processor 240 may store at least one instruction in an internal memory, and may execute at least one instruction stored in the internal memory to control operations of a display apparatus to be performed. That is, the processor 240 may execute at least one instruction or program stored in the internal memory of the processor 240 or the memory 230 to perform a preset operation.

According to an embodiment, the processor 240 may execute at least one instruction stored in the memory 230 to perform communication connection to the display apparatus 100 by using a short-range wireless communication technology. The short-range wireless communication technology may include a Bluetooth communication technology or a Wi-Fi direct technology.

According to an embodiment, the processor 240 may execute at least one instruction stored in the memory 230 to receive information for wireless communication connection from the display apparatus 100, and to access an access point 70 by performing wireless communication connection by using the received information for wireless communication connection. For example, the information for wireless communication connection is information for access point connection, and may include an access point identification (ID), a password for accessing an access point, and the like.

According to an embodiment, the processor 240 may execute at least one instruction stored in the memory 230 to receive, from the display apparatus 100, information for connection to the server apparatus 300, and may connect to the server apparatus 300 by using the received information for connection to the server apparatus 300. For example, the information for connection to the server apparatus 300 may include a uniform resource locator (URL) for accessing the server apparatus 300, user ID or password as user account information for connecting to the server apparatus 300, and the like.

According to an embodiment, the processor 240 may execute at least one instruction stored in the memory 230 to receive a list of at least one input signal indicating a specified value from the display apparatus 100, and may transmit the received list of the at least one input signal to the server apparatus 300.

According to an embodiment, the processor 240 may execute at least one instruction stored in the memory 230 to transmit, to the server apparatus 300 or the display apparatus 100, an input signal corresponding to a user input received via the user input unit 220.

According to an embodiment, the processor 240 may execute at least one instruction stored in the memory 230 to transmit, to the display apparatus 100, an input signal corresponding to a user input received via the user input unit 220, based on information indicating a menu mode being received from the display apparatus 100.

According to an embodiment, the processor 240 may execute at least one instruction stored in the memory 230 to transmit, to the server apparatus 300, an input signal corresponding to a user input received via the user input unit 220, based on information indicating an end of the menu mode being received from the display apparatus 100.

The controller 200 may be any apparatus including a processor and a memory to perform a function. The controller 200 may include various electronic apparatuses such as a remote controller, a game controller, a smartphone, or the like. The controller may be referred to as an external device in association with the display apparatus.

According to an embodiment, each element in the block diagram of the controller 200, as shown in FIG. 2, may be integrated, added, or omitted according to the specification of the controller 200 that is actually implemented. For example, two or more elements may be combined into a single component, or a single component may be split into two or more components when necessary. Functions performed in each block are intended to describe embodiments of the disclosure, and a specific operation or device related to the functions does not limit the scope of the disclosure.

Hereinafter, the server apparatus 300 will now be described.

The server apparatus 300 may include a communication interface 310, a memory 320, and a processor 330. However, the server apparatus 300 may be embodied with more elements than the shown elements, and embodiments of the disclosure is not limited thereto. For example, the server apparatus 300 may include a separate image processor to perform image processing on an image of an application executed by the server apparatus 300.

The communication interface 310 may include at least one module for allowing wireless communication between the server apparatus 300 and a wireless communication system or between the server apparatus 300 and a network where other apparatus exists. The communication interface 310 according to an embodiment may perform communication with the display apparatus 100, according to an IP. The communication interface 310 according to an embodiment may perform communication with the controller 200, according to an IP.

The memory 320 may store a program for processing and controlling by the processor 330, and may store data input to the server apparatus 300 or output from the server apparatus 300.

The memory 320 may include at least one type of storage medium from among flash memory, a hard disk, a multimedia card micro, a memory card (e.g., a SD or XD memory card), RAM, SRAM, ROM, EEPROM, PROM, magnetic memory, a magnetic disk, and an optical disc.

The processor 330 controls all operations of the server apparatus 300. For example, the processor 330 may execute at least one instruction stored in the memory 320 to perform a function of the server apparatus 300, according to an embodiment.

In an embodiment, the processor 330 may store at least one instruction in an internal memory, and may execute at least one instruction stored in the internal memory to control operations of a display apparatus to be performed. That is, the processor 330 may execute at least one instruction or program stored in the internal memory of the processor 330 or the memory 320 to perform a preset operation.

According to an embodiment, the processor 330 may execute at least one instruction stored in the memory 320 to receive a request for execution of a contents application from the display apparatus 100, and to transmit, to the display apparatus 100, result content according to execution of the contents application requested for execution.

According to an embodiment, the processor 330 may execute at least one instruction stored in the memory 320 to receive a list of at least one input signal indicating a specified value from the display apparatus 100 or the controller 200, and to store the received list of the at least one input signal.

According to an embodiment, the processor 330 may execute at least one instruction stored in the memory 320 to execute a contents application based on an input signal received from the controller 200, according to information indicating a contents reproduction control mode of the display apparatus 100 being received from the display apparatus 100, and to transmit execution result content to the display apparatus 100.

According to an embodiment, the processor 330 may execute at least one instruction stored in the memory 320 to changelessly transmit the input signal indicating a specified value to the display apparatus 100, based on the input signal indicating the specified value, the input signal being received from the controller 200.

According to an embodiment, the processor 330 may execute at least one instruction stored in the memory 320 to changelessly transmit the input signal received from the controller 200 to the display apparatus 100, based on information indicating a menu mode of the display apparatus 100 being received from the display apparatus 100.

According to an embodiment, the processor 330 may execute at least one instruction stored in the memory 320 to control the communication interface to transmit, to a display apparatus, execution result content obtained by executing a contents application.

According to an embodiment, the processor 330 may execute at least one instruction stored in the memory 320 to control the communication interface to receive an input signal from a controller.

According to an embodiment, the processor 330 may execute at least one instruction stored in the memory 320 to identify whether the input signal indicates a specified value.

According to an embodiment, the processor 330 may execute at least one instruction stored in the memory 320 to, based on identifying that the input signal indicates the specified value, control the communication interface to transmit, to the display apparatus, the input signal for allowing the display apparatus to output a user interface screen.

According to an embodiment, the processor 330 may execute at least one instruction stored in the memory 320 to, based on identifying that the input signal does not indicate the specified value, control the communication interface to transmit, to the display apparatus, execution result content obtained by executing the contents application, according to the input signal.

According to an embodiment, the processor 330 may execute at least one instruction stored in the memory 320 to control the communication interface to transmit, to the display apparatus, an input signal received from the controller, while the display apparatus operates in a menu mode of outputting the user interface screen.

According to an embodiment, the processor 330 may execute at least one instruction stored in the memory 320 to control the communication interface to receive, from the display apparatus, a signal indicating that the display apparatus operates in a contents reproduction control mode, while the display apparatus operates in the menu mode.

According to an embodiment, the processor 330 may execute at least one instruction stored in the memory 320 to recognize that the display apparatus operates in the contents reproduction control mode, based on the signal being received.

According to an embodiment, the processor 330 may execute at least one instruction stored in the memory 320 to control the communication interface to transmit, based on the recognizing, execution result content to the display apparatus, the execution result content being obtained by executing the contents application, based on an input signal being received from the controller.

According to an embodiment, the processor 330 may execute at least one instruction stored in the memory 320 to receive, from the display apparatus, a list including at least one input signal indicating the specified value and to store the list.

According to an embodiment, each element in the block diagram of the server apparatus 300, as shown in FIG. 2, may be integrated, added, or omitted according to the specification of the server apparatus 300 that is actually implemented. For example, two or more elements may be combined into a single component, or a single component may be split into two or more components when necessary. Functions performed in each block are intended to describe embodiments of the disclosure, and a specific operation or device related to the functions does not limit the scope of the disclosure.

Figure 3:
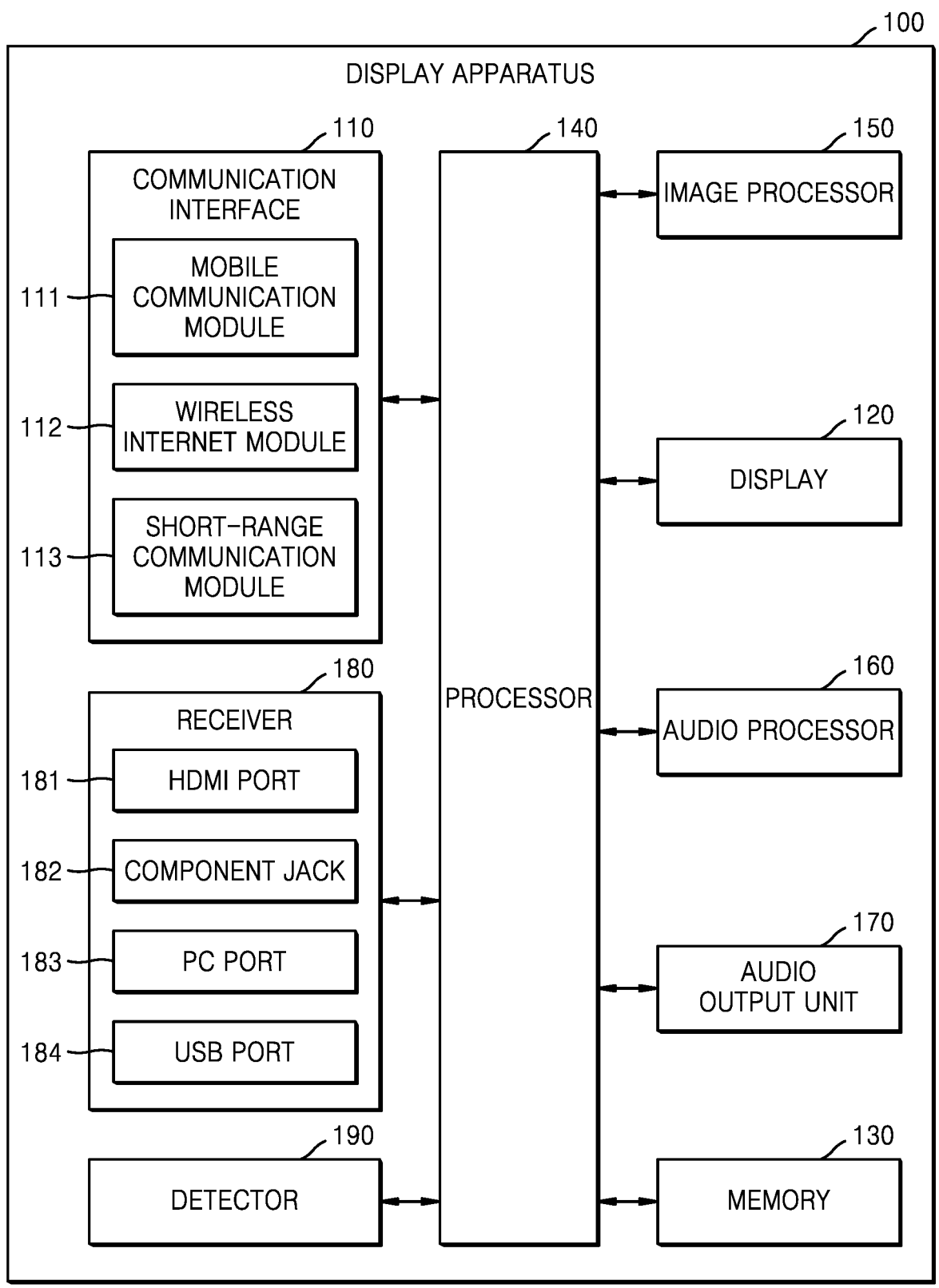
FIG. 3 illustrates a block diagram of a display apparatus according to an embodiment.

FIG. 3 illustrates a block diagram of a display apparatus according to an embodiment.

Referring to FIG. 3, the display apparatus 100 may include an image processor 150, an audio processor 160, an audio output unit 170, a receiver 180, and a detector 190, as well as the communication interface 110, the display 120, the memory 130, and the processor 140.

The communication interface 110 may include at least one module for allowing wireless communication between the display apparatus 100 and a wireless communication system or between the display apparatus 100 and a network where other apparatus exists. For example, the communication interface 110 may include a mobile communication module 111, a wireless internet module 112, and a short-range communication module 113.

The mobile communication module 111 transmits and receives a radio signal to and from at least one of a base station, an external terminal, or a server on a mobile communication network. The radio signal may include a voice call signal, a video call signal, or various types of data according to the transmission and reception of text/multimedia messages.

The wireless internet module 112 refers to a module for wireless internet access and may be embedded in or mounted outside the display apparatus 100. As a wireless internet technology, Wireless Local Area Network (WLAN including Wi-Fi), Wireless broadband (WiBro), World Interoperability for Microwave Access (WiMax), High Speed Downlink Packet Access (HSDPA), or the like may be used. The display apparatus 100 may perform Wi-Fi Peer-to-Peer (P2P) connection to other device via the wireless internet module 112.

The short-range communication module 113 refers to a module for short-range communication. As a short-range communication technology, Bluetooth, Bluetooth Low Energy (BLE), Radio Frequency Identification (RFID), infrared Data Association (IrDA), Ultra Wideband (UWB), ZigBee, or the like may be used.

The display 120 may display, on a screen, an image signal received from the server apparatus 300.

The memory 130 may store a program associated with an operation of the display apparatus 100 and various data generated during an operation of the display apparatus 100.

The memory 130 may store at least one instruction. Also, the memory 130 may store at least one instruction executable by the processor 140. Also, the memory 130 may store at least one program executable by the processor 140. Also, the memory 130 may store an application for providing a preset service.

In detail, the memory 130 may include at least one type of storage medium from among flash memory, a hard disk, a multimedia card micro, a memory card (e.g., a SD or XD memory card), RAM, SRAM, ROM, EEPROM, PROM, magnetic memory, a magnetic disk, and an optical disc.

The processor 140 controls all operations of the display apparatus 100. For example, the processor 140 may execute at least one instruction stored in the memory 130 to perform functions of the display apparatus 100, according to an embodiment.

In an embodiment, the processor 140 may store at least one instruction in an internal memory, and may execute at least one instruction stored in the internal memory to control operations of a display apparatus to be performed. That is, the processor 140 may execute at least one instruction or program stored in the internal memory of the processor 140 or the memory 130 to perform a preset operation.

The image processor 150 may process an image signal received from the receiver 180 or the communication interface 110 and may output the image signal to the display 120, according to control by the processor 140.

The audio processor 160 may convert an audio signal, which is received from the receiver 180 or the communication interface 110, into an analog audio signal and may output the analog audio signal to the audio output unit 170, according to control by the processor 140.

The audio output unit 170 may output audio (e.g., a speech or sound) that is input via the communication interface 110 or the receiver 180. Also, the audio output unit 170 may output audio stored in the memory 130, according to control by the processor 140. The audio output unit 170 may include at least one of a speaker, a headphone output terminal, or a Sony/Philips Digital Interface (S/PDIF) output terminal, or a combination thereof.

The receiver 180 may receive a video (for example, a moving image or the like), audio (for example, a voice, music, or the like), additional information (for example, an electronic program guide (EPG) or the like), and the like from outside the display apparatus 100, by control by the processor 140. The receiver 180 may include one of a High-Definition Multimedia Interface (HDMI) port 181, a component jack 182, a personal computer (PC) port 183, and a universal serial bus (USB) port 184 or may include a combination of one or more thereof. The receiver 180 may further include a DisplayPort (DP), Thunderbolt, and a Mobile High-Definition Link (MHL), as well as the HDMI port 181.

The detector 190 may detect a user speech, a user image, or a user interaction, and may include a microphone, a camera unit, and a light receiver.

The microphone receives an uttered speech of the user. The microphone may convert the received speech into an electrical signal and may output the electrical signal to the processor 140. For example, the user speech may include a speech corresponding to a menu or a function of the display apparatus 100.

The camera unit may receive an image (for example, consecutive frames) corresponding to a motion of the user, which includes a gesture, in a camera recognition range. The processor 140 may select a menu displayed on the display apparatus 100, by using a recognition result of the received motion, or may perform control corresponding to the recognition result of the received motion.

The light receiver receives a light signal (including a control signal) received from an external control apparatus. The light receiver may receive, from the control apparatus, a light signal corresponding to a user input (e.g., a touch, a pressure, a touch gesture, a speech, or a motion). The control signal may be extracted from the received light signal, according to control by the processor 140.

The memory 130 may store a program associated with an operation of the display apparatus 100 and various data generated during an operation of the display apparatus 100.

The processor 140 performs a function of controlling all operations of the display apparatus 100 and signal flow between internal elements of the display apparatus 100 and processing data. When an input from the user is provided or a preset and stored condition is satisfied, the processor 140 may execute an operating system (OS) and various applications which are stored in the memory 130.

The processor 140 may include a graphics processing unit for graphic processing corresponding to a video. The graphics processing unit generates a screen including various objects such as an icon, an image, text, or the like by using a calculator and a renderer. The calculator calculates an attribute value of each object to be displayed such as a coordinate value, a shape, a size, and a color according to a layout of the screen by using user interaction detected by the detector 190. The renderer generates a screen of various layouts including an object, based on the attribute value calculated by the calculator.

According to an embodiment, the processor 140 may execute at least one instruction to control the communication interface to receive, from a server, execution result content obtained by executing a contents application, based on an input signal from a controller connected to the server and configured to provide the input signal.

According to an embodiment, the processor 140 may execute at least one instruction to control the display to display the execution result content received from the server.

According to an embodiment, the processor 140 may execute at least one instruction to control the communication interface to receive, from the server, an input signal indicating a specified value from the controller.

According to an embodiment, the processor 140 may execute at least one instruction to display a user interface screen for controlling the display apparatus, based on receiving the input signal indicating the specified value.

According to an embodiment, the processor 140 may execute at least one instruction to receive an input signal from the controller and perform an operation for controlling the display apparatus, based on the input signal, while the user interface screen is displayed.

According to an embodiment, the processor 140 may execute at least one instruction to receive an input signal from the controller via the server or control the communication interface to directly receive the input signal from the controller, while the user interface screen is displayed.

According to an embodiment, the processor 140 may execute at least one instruction to, while the user interface screen is displayed, control the display to end displaying of the user interface screen according to an input signal for ending the user interface screen.

According to an embodiment, the processor 140 may execute at least one instruction to control the communication interface to transmit, to the server, a signal indicating that the display apparatus operates in a contents reproduction control mode, according to the ending of the user interface screen.

According to an embodiment, the processor 140 may execute at least one instruction to control the communication interface to receive, from the server, execution result content obtained by executing the contents application, according to an input signal received from the controller in response to transmission of the signal indicating that the display apparatus operates in the contents reproduction control mode.

According to an embodiment, the processor 140 may execute at least one instruction to identify whether a type of the contents application is a specified type, and based on the type of the contents application being the specified type, to control the communication interface to transmit, to the server, a list including at least one input signal indicating the specified value.

According to an embodiment, the processor 140 may execute at least one instruction to identify whether a type of the contents application is a specified type, and based on the type of the contents application being the specified type, to transmit, to the controller, information for allowing the controller to be directly connected to the server and a command for controlling connection to the server.

Figure 4:
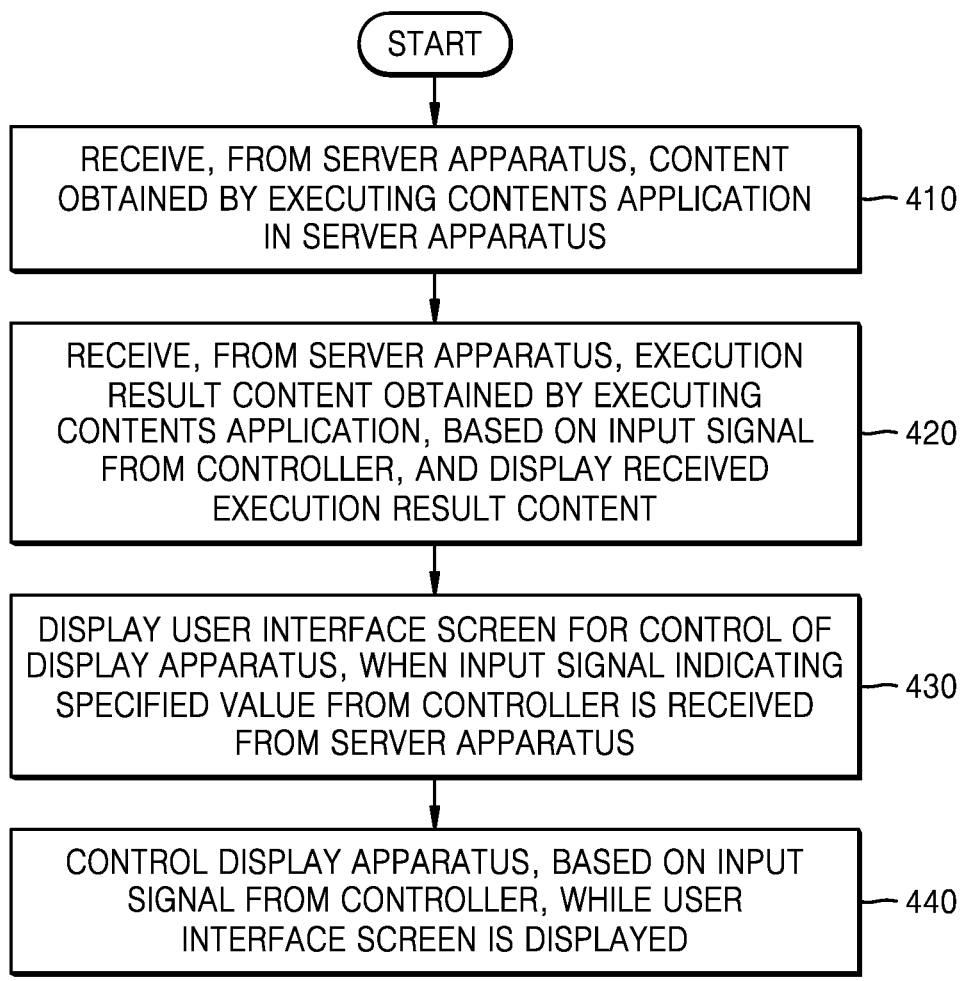
FIG. 4 illustrates a flowchart of an operating method of a display apparatus according to an embodiment.

FIG. 4 illustrates a flowchart of an operating method of a display apparatus according to an embodiment.

Referring to FIG. 4, in operation 410, the display apparatus 100 may receive, from the server apparatus 300, content obtained by executing a contents application in the server apparatus 300.

According to an embodiment, the display apparatus 100 may transmit an execution request for a contents application to the server apparatus 300, and the server apparatus 300 may perform execution of the contents application, based on the execution request received from the display apparatus 100. The server apparatus 300 may transmit, to the display apparatus 100, execution result content obtained by executing the contents application. The display apparatus 100 may provide information about the contents application for requesting execution of the contents application, and an item or an interface for requesting execution of the contents application. When a user selects an application by controlling the item or the interface, the display apparatus 100 may transmit, to the server apparatus 300, a request for execution of the contents application requested by the user. The server apparatus 300 may execute the execution-requested contents application, and may transmit an image or a screen output as a result of the execution, to the display apparatus 100. For example, when content is game content, the server apparatus 300 may execute a game application, and may transmit, to the display apparatus 100, an image or a screen which is output as a result of the execution, for example, a prequel image, an intro-screen, a screen of information about the game contents, or the like which is initially displayed according to execution of the game content.

In operation 420, the display apparatus 100 may receive, from the server apparatus 300, the execution result content obtained by executing the contents application, based on an input signal from the controller 200, and may display the received execution result content.

According to an embodiment, the controller 200 may connect to the server apparatus 300 via a wireless communication network, and may transmit an input signal based on a user operation to the server apparatus 300.

According to an embodiment, when the server apparatus 300 receives the input signal from the controller 200, the server apparatus 300 may control execution of the contents application by using the received input signal, and may transmit the obtained execution result content to the display apparatus 100.

According to an embodiment, the display apparatus 100 may display the execution result content of the contents application which is received from the server apparatus 300.

For example, while the display apparatus 100 displays the game content received from the server apparatus 300, the user may operate a user input by using the controller 200 to play the game content. The controller 200 may perform a user operation for an input signal corresponding to the user input, for example, the user operation for moving a character of the game content, and thus, may transmit the input signal corresponding to movement of the character to the server apparatus 300. Then, the server apparatus 300 may execute the contents application by performing calculation to move the character, based on the input signal corresponding to movement of the character, and may transmit, to the display apparatus 100, result content output by executing the contents application, e.g., a screen in which the character is moved.

In operation 430, when an input signal indicating a specified value from the controller 200 is received from the server apparatus 300, the display apparatus 100 may display a user interface screen for control of the display apparatus 100.

According to an embodiment, the display apparatus 100 may receive, from the server apparatus 300, the input signal indicating the specified value from the controller 200. For example, when the display apparatus 100 receives, from the server apparatus 300, a signal, e.g., "aaa1", indicating the specified value from among controller input signals as shown in FIG. 5, the display apparatus 100 may identify that the display apparatus 100 has received the input signal indicating the specified value.

According to an embodiment, in a case where the server apparatus 300 receives an input signal from the controller 200, when the input signal does not indicate the specified value, the server apparatus 300 may execute the contents application, based on the input signal, and may transmit an execution result screen to the display apparatus 100, however, when the input signal indicates the specified value, the server apparatus 300 may changelessly transmit the input signal indicating the specified value to the display apparatus 100.

According to an embodiment, when the display apparatus 100 receives the input signal indicating the specified value from the server apparatus 300, the display apparatus 100 may display a user interface screen for control of the display apparatus 100. The user interface screen for control of the display apparatus 100 may refer to a menu screen for controlling elements of the display apparatus 100 which are adjustable by the user. For example, the menu screen may include at least one item or buttons for controlling a sound volume, a display brightness, or audio input/output interfaces of the display apparatus 100.

In operation 440, while the user interface screen is displayed, the display apparatus 100 may control the display apparatus 100, based on an input signal from the controller 200.

According to an embodiment, the display apparatus may receive the input signal from the controller 200 while the user interface screen is displayed, and may control the display apparatus 100, based on the received input signal.

According to an embodiment, while the user interface screen is displayed, the display apparatus 100 may directly receive the input signal of the controller 200 from the controller 200 or may receive the input signal of the controller 200 via the server apparatus 300.

For example, the user may perform, via the user interface screen by using the controller 200, an operation of raising a volume to raise the volume of the display apparatus 100, and the controller 200 may transmit an input signal corresponding to the operation of raising the volume to the display apparatus 100 directly or to the server apparatus 300. The server apparatus 300 may transmit the input signal received from the controller 200 to the display apparatus 100. In this manner, the display apparatus 100 having received the input signal from the server apparatus 300 or the controller 200 may convert the input signal into a display apparatus control signal, and may control the display apparatus 100 by using the display apparatus control signal.

According to an embodiment, the display apparatus 100 may convert the input signal from the controller 200, by using a controller input signal-display apparatus control signal conversion table.

FIG. 5 illustrates a table for conversion of a controller input signal into a display apparatus control signal, according to an embodiment.

Referring to FIG. 5, a conversion table 500 may indicate a mapping table for conversion of an input signal from the controller 200 into a display apparatus control signal.

The conversion table 500 for conversion of the input signal from the controller 200 into the display apparatus control signal used to control the display apparatus 100 may indicate the mapping table of values of the input signal from the controller 200 and values of the display apparatus control signal. Referring to FIG. 5, values of the input signal from the controller 200, which are aaa1, aaa2, aaa3, aaa4, aaa5, and aaa6, may be respectively mapped to values of the display apparatus control signal, which are d1, d2, d3, d4, d5, and d6.

In this manner, while the display apparatus 100 operates in a menu mode for controlling the display apparatus 100, the display apparatus 100 may control the display apparatus 100 by converting the input signal from the controller 200 into the display apparatus control signal by using the conversion table 500 shown in FIG. 5 so as to use the input signal from the controller 200 in control of the display apparatus 100.

According to an embodiment, an operating method of a display apparatus may include receiving, from a server apparatus, execution result content obtained by executing a contents application, based on an input signal from a controller connected to the server apparatus and configured to provide the input signal.

According to an embodiment, the operating method of the display apparatus may include displaying the execution result content.

According to an embodiment, the operating method of the display apparatus may include receiving, from the server apparatus, an input signal indicating a specified value from the controller.

According to an embodiment, the operating method of the display apparatus may include displaying a user interface screen for controlling the display apparatus, based on receiving the input signal indicating the specified value.

According to an embodiment, the operating method of the display apparatus may include receiving an input signal from the controller and performing an operation for controlling the display apparatus, based on the input signal, while the user interface screen is displayed.

According to an embodiment, the operating method of the display apparatus may include receiving an input signal from the controller via the server apparatus or directly receiving the input signal from the controller, while the user interface screen is displayed.

According to an embodiment, the operating method of the display apparatus may include, while the user interface screen is displayed, ending displaying of the user interface screen according to an input signal for ending the user interface screen.

According to an embodiment, the operating method of the display apparatus may include transmitting, to the server apparatus, a signal indicating that the display apparatus operates in a contents reproduction control mode, according to the ending of the user interface screen.

According to an embodiment, the operating method of the display apparatus may include receiving, from the server apparatus, execution result content obtained by executing the contents application, according to an input signal received from the controller in response to transmission of the signal indicating that the display apparatus operates in the contents reproduction control mode.

According to an embodiment, the operating method of the display apparatus may include identifying whether a type of the contents application is a specified type.

According to an embodiment, the operating method of the display apparatus may include transmitting, to the server apparatus, a list including at least one input signal indicating the specified value, based on the type of the contents application being the specified type.

According to an embodiment, the operating method of the display apparatus may include identifying whether a type of the contents application is a specified type.

According to an embodiment, the operating method of the display apparatus may include, based on the type of the contents application being the specified type, transmitting, to the controller, information for allowing the controller to be directly connected to the server and a command for controlling connection to the server.

Figure 6:
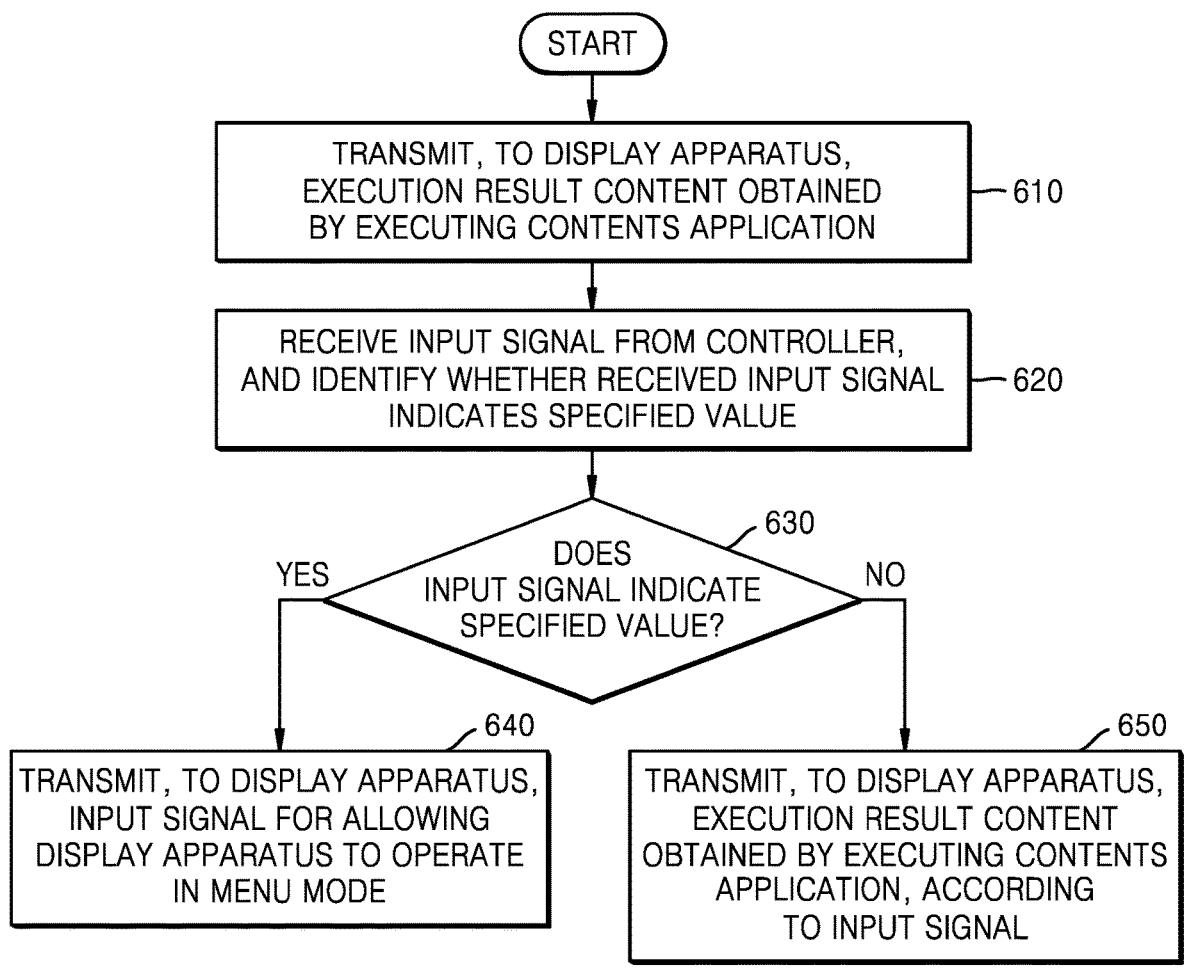
FIG. 6 illustrates a flowchart of an operating method of a server apparatus according to an embodiment.

FIG. 6 illustrates a flowchart of an operating method of a server apparatus according to an embodiment.

Referring to FIG. 6, in operation 610, the server apparatus 300 may transmit, to the display apparatus 100, execution result content obtained by executing a contents application.

According to an embodiment, the server apparatus 300 may receive an execution request for the contents application from the display apparatus 100, and may transmit, to the display apparatus 100, the execution result content obtained by executing the contents application, in response to the execution request.

In operation 620, the server apparatus 300 may receive an input signal from the controller 200, and may identify whether the received input signal indicates a specified value.

According to an embodiment, the server apparatus 300 may receive and store a list including at least one input signal indicating the specified value from the display apparatus 100, or may receive and store a list including at least one input signal indicating the specified value from the controller 200. For example, in the conversion table 500 shown in FIG. 5, the server apparatus 300 may receive and store a controller input signal <aaa1> as the list including at least one input signal indicating the specified value. For example, <aaa1> may be a value of a signal corresponding to pressing a home key from among at least one key provided at the controller 200.

According to an embodiment, when the server apparatus 300 receives an input signal from the controller 200, the server apparatus 300 may identify whether a value of the received input signal indicates the specified value.

In operation 630, the server apparatus 300 may determine whether the input signal from the controller 200 indicates the specified value, and when it indicates the specified value, the server apparatus 300 may proceed to operation 640, and when it does not indicate the specified value, the server apparatus 300 may proceed to operation 650.

In operation 640, when the server apparatus 300 determines that the input signal from the controller 200 indicates the specified value, the server apparatus 300 may transmit, to the display apparatus 100, an input signal for allowing the display apparatus 100 to operate in a menu mode.

According to an embodiment, when the server apparatus 300 determines that the input signal from the controller 200 indicates the specified value, the server apparatus 300 may changelessly transmit, to the display apparatus 100, the input signal received from the controller 200. Then, the display apparatus 100 having received the input signal indicating the specified value may display a user interface screen for control of the display apparatus 100. A mode for control of the display apparatus 100 in a manner that the display apparatus 100 displays the user interface screen may be referred to as the menu mode.

In operation 650, when the server apparatus 300 determines that the input signal from the controller 200 does not indicate the specified value, the server apparatus 300 may transmit, to the display apparatus 100, execution result content obtained by executing the contents application by using the input signal from the controller 200.

According to an embodiment, when the server apparatus 300 determines that the input signal from the controller 200 does not indicate the specified value, the server apparatus 300 may use the input signal from the controller 200 so as to control execution of the contents application. That is, the server apparatus 300 may perform calculation for execution of the contents application by using the input signal from the controller 200, and may transmit, to the display apparatus 100, execution result content obtained by performing the calculation. A mode in which the display apparatus 100 displays content from the server apparatus 300, and reproduction of the content displayed on the display apparatus 100 is controlled based on the input signal from the controller 200 may be referred to as a contents reproduction control mode.

According to an embodiment, an operating method of a server apparatus may include transmitting, to a display apparatus, execution result content obtained by executing a contents application.

According to an embodiment, the operating method of the server apparatus may include receiving an input signal from a controller.

According to an embodiment, the operating method of the server apparatus may include identifying whether the input signal indicates a specified value.

According to an embodiment, the operating method of the server apparatus may include transmitting, to the display apparatus, the input signal for allowing the display apparatus to output a user interface screen, based on identifying that the input signal indicates the specified value.

According to an embodiment, the operating method of the server apparatus may include, based on identifying that the input signal does not indicate the specified value, transmitting, to the display apparatus, execution result content obtained by executing the contents application according to the input signal.

According to an embodiment, the operating method of the server apparatus may include transmitting, to the display apparatus, an input signal received from the controller, while the display apparatus operates in a menu mode of outputting the user interface screen.

According to an embodiment, the operating method of the server apparatus may include receiving, from the display apparatus, a signal indicating that the display apparatus operates in a contents reproduction control mode, while the display apparatus operates in the menu mode.

According to an embodiment, the operating method of the server apparatus may include recognizing that the display apparatus operates in the contents reproduction control mode, based on the signal being received.

According to an embodiment, the operating method of the server apparatus may include transmitting, based on the recognizing, execution result content to the display apparatus, the execution result content being obtained by executing the contents application, based on an input signal being received from the controller.

Figure 7:
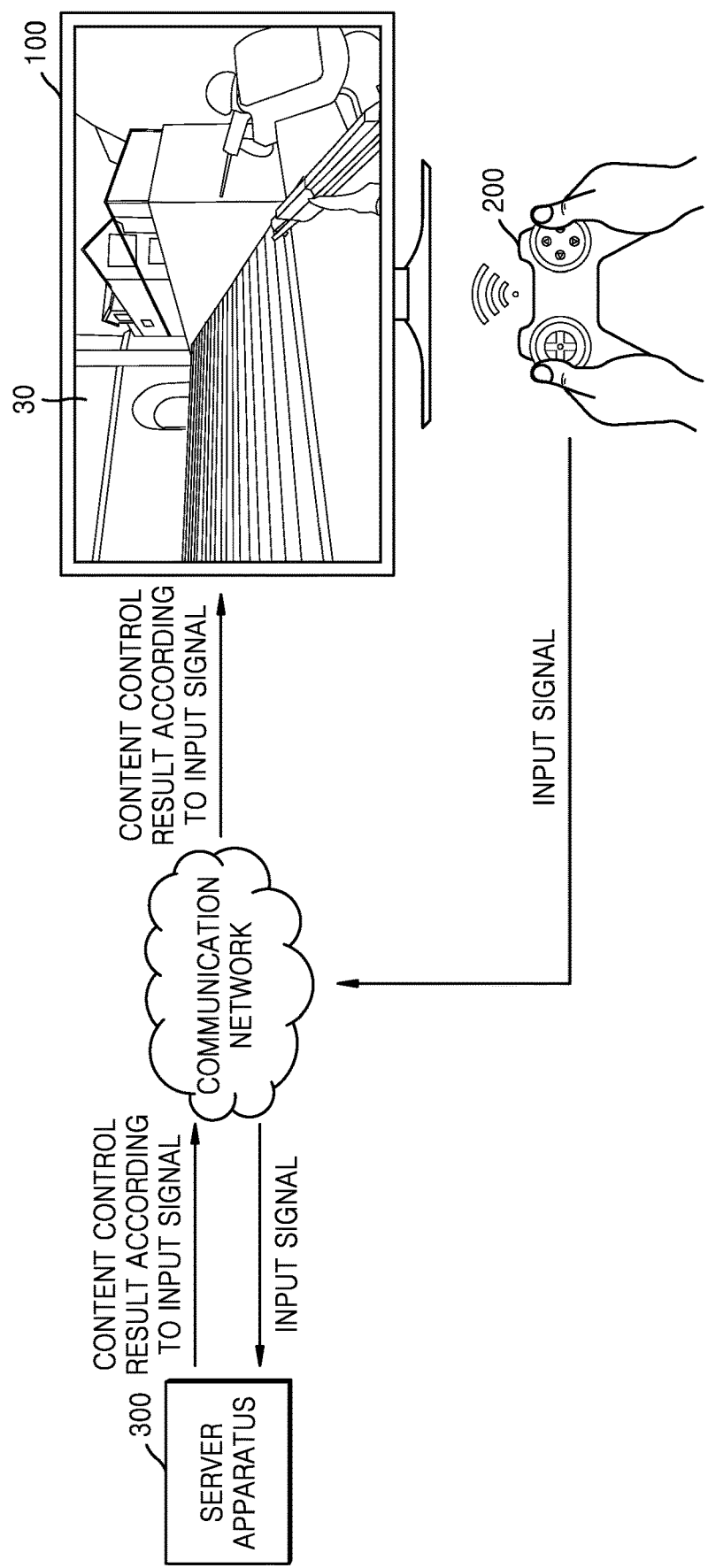
FIG. 7 illustrates an operation of a display apparatus in a contents reproduction control mode, according to an embodiment.

FIG. 7 illustrates an operation of the display apparatus 100 in a contents reproduction control mode, according to an embodiment.

Referring to FIG. 7, the display apparatus 100 in the contents reproduction control mode may receive and display execution result content as the result screen 30 of an executed application from the server apparatus 300. When a user desires to control execution of content displayed on the display apparatus 100, the user may operate one or more input keys or input buttons provided at the controller 200.

According to an embodiment, when there is a user operation input, the controller 200 may transmit an input signal corresponding to the user operation input to the server apparatus 300. In this manner, the server apparatus 300 having received the input signal from the controller 200 may execute an application by using the input signal from the controller 200, during a contents reproduction control mode of the display apparatus 100. According to an embodiment, the server apparatus 300 may receive, from the display apparatus 100, a signal indicating that the display apparatus 100 is in the contents reproduction control mode. When content of which execution is controllable by a user exists in a foreground layer from among at least one layer displayed on a display, the display apparatus 100 may identify the contents reproduction control mode of the display apparatus 100.

The server apparatus 300 may perform calculation for execution of an application by using the input signal from the controller 200, and may transmit, to the display apparatus 100, execution result content obtained according to the calculation result.

Figure 8:
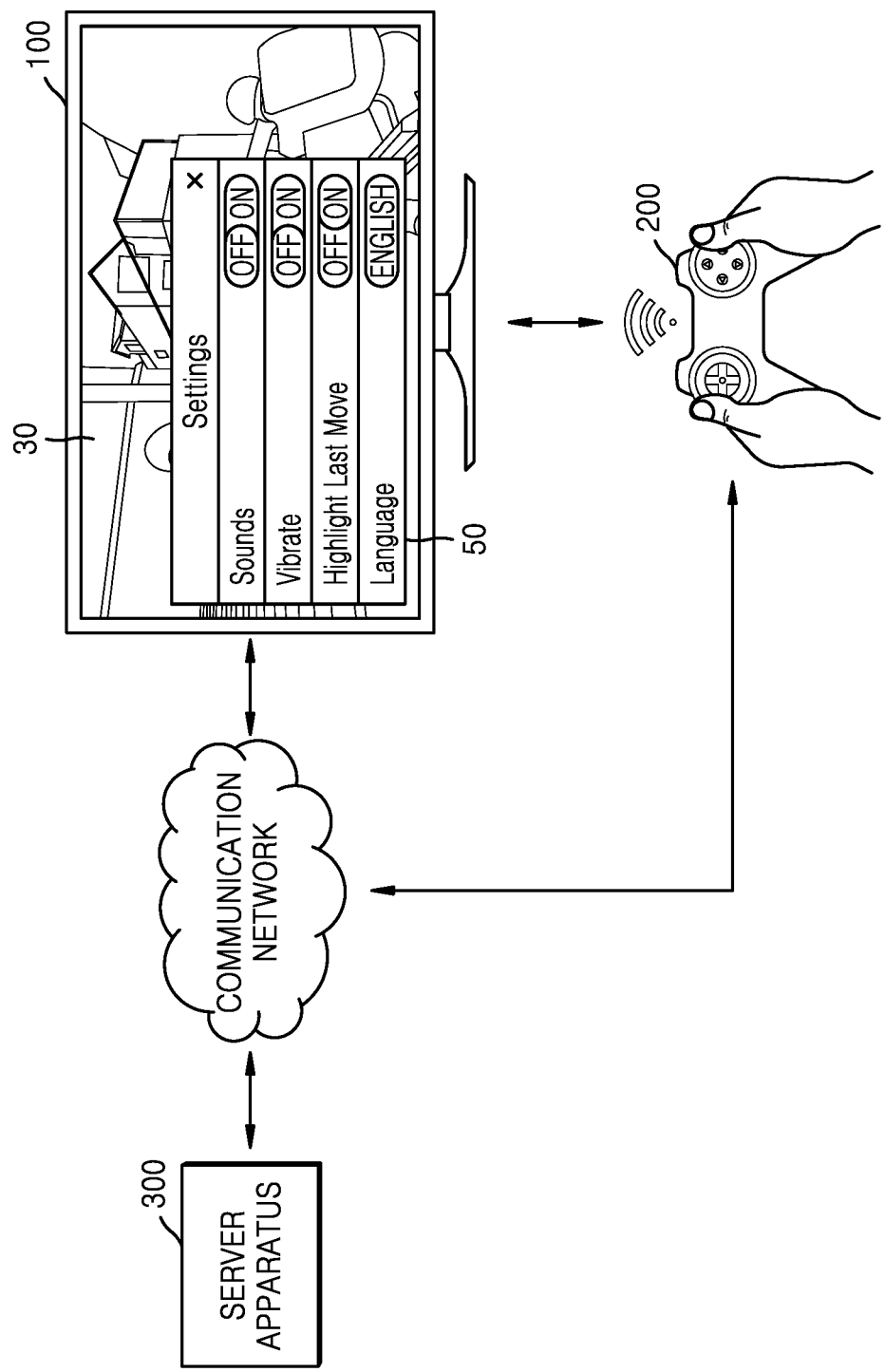
FIG. 8 illustrates an operation of a display apparatus in a menu mode according to an embodiment.

FIG. 8 illustrates an operation of a display apparatus in a menu mode according to an embodiment.

Referring to FIG. 8, a user may desire to change settings of the display apparatus 100 while the user plays content of which execution is controllable by the user via the display apparatus 100. For example, there may be a need to display a menu screen for changing settings so as to adjust sound, adjust a display screen brightness, or change language of the display apparatus 100. Here, the user may select and press a key corresponding to a specified value via the controller 200, so that an input signal having the specified value may be transmitted to the server apparatus 300.

When the server apparatus 300 receives the input signal indicating the specified value from the controller 200, the server apparatus 300 may changelessly transmit the input signal to the display apparatus 100, instead of performing calculation for application execution by using the input signal.

When the display apparatus 100 having received the input signal indicating the specified value from the server apparatus 300 identifies that the input signal indicates the specified value, the display apparatus 100 may output a user interface screen 50 for controlling settings of the display apparatus 100.

In this manner, as the display apparatus 100 switches to a state in which settings of the display apparatus 100 are controllable according to a user input as the user interface screen 50 for controlling settings of the display apparatus 100 is output, the display apparatus 100 may identify its operation mode as a menu mode.

According to an embodiment, the display apparatus 100 may transmit, to the server apparatus 300, a signal indicating that the operation mode of the display apparatus 100 is the menu mode. In this case, while the operation mode of the display apparatus 100 is the menu mode, when the server apparatus 300 receives an input signal from the controller 200, the server apparatus 300 may changelessly transmit the input signal from the controller 200 to the display apparatus 100.

According to an embodiment, the display apparatus 100 may transmit, to the controller 200, a signal indicating that the operation mode of the display apparatus 100 is the menu mode. When the operation mode of the display apparatus 100 is the menu mode and there is a user input, the controller 200 may transmit an input signal corresponding to the user input to the display apparatus 100, not to the server apparatus 300.

Figure 9:
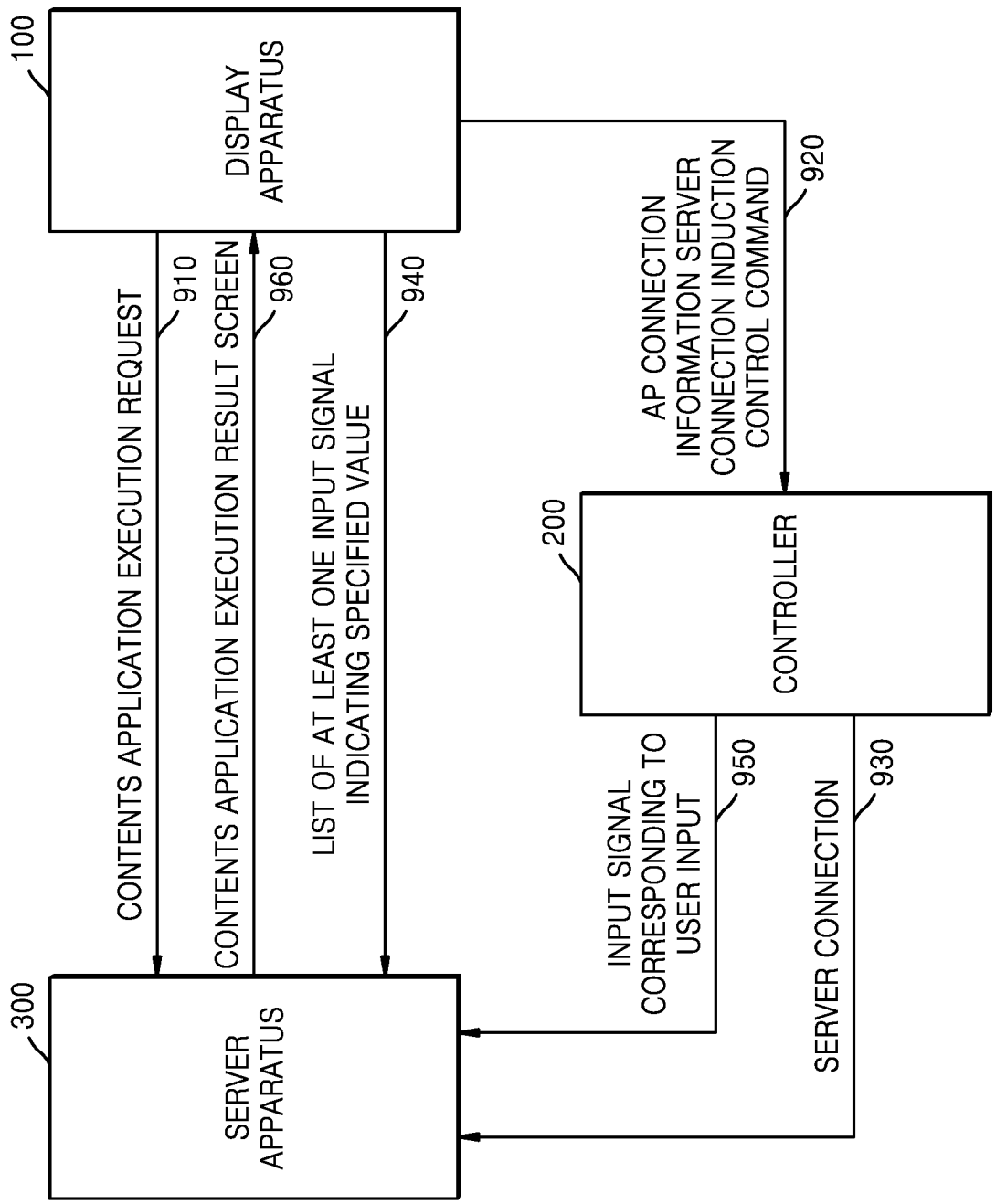
FIG. 9 illustrates an operation of a display apparatus connecting a server apparatus with a controller, according to an embodiment.

FIG. 9 illustrates an operation of a display apparatus connecting a server apparatus with a controller, according to an embodiment.

Referring to FIG. 9, the display apparatus 100 may transmit a contents application execution request 910 to the server apparatus 300. For example, when a user of the display apparatus 100 selects a particular contents application as the user desires to execute the particular contents application, the display apparatus 100 may transmit, to the server apparatus 300, a request for execution of the contents application selected by the user.

The display apparatus 100 may obtain information about the execution-requested contents application. The information about the execution-requested contents application may be internally stored in the display apparatus 100 or may be received from the server apparatus 300. The information about the contents application may include information indicating whether the contents application is a server-controller direct connection type.

According to an embodiment, when it is identified that the contents application is the server-controller direct connection type, the display apparatus 100 may perform an operation for allowing the controller 200 and the server apparatus 300 to be directly connected with each other. That is, the display apparatus 100 may transmit, to the controller 200, information necessary for a server connection operation of the controller 200 and a server connection induction control command 920. The information necessary for the server connection operation may include access point connection information for the controller 200 to first connect to a wireless internet and server connection information for access to the server via the wireless internet. The access point connection information may include access point ID information and a password for connecting to an access point. The server connection information may include a URL of the server apparatus 300, a password for accessing the server apparatus 300, or the like. The server connection induction control command 920 may indicate a control command for inducing the controller 200 to directly connect to the server apparatus 300 by using the access point connection information and the server connection information.

According to an embodiment, when the display apparatus 100 identifies that the contents application is the server-controller direct connection type, the display apparatus 100 may transmit a list of at least one input signal indicating a specified value 940 to the server apparatus 300. The reason why the list of at least one input signal indicating specified value 940 is transmitted is for the display apparatus 100 to switch from a contents reproduction control mode to a menu mode.

According to an embodiment, the controller 200 may perform an operation of connecting to the server apparatus 300, according to the server connection induction control command 920 received from the display apparatus 100. First, the controller 200 may connect to a wireless internet by using the access point connection information, and then may perform a connection operation 930 on the server apparatus 300 by using the server connection information.

According to an embodiment, when the controller 200 receives a user input, the controller 200 may transmit an input signal 950 corresponding the user input to the server apparatus 300, may execute the contents application, based on the input signal received from the controller 200, and may transmit a contents application execution result screen 960 to the display apparatus 100.

According to operations described with reference to FIG. 9, the display apparatus 100 may allow the controller 200 to directly connect to the server apparatus 300 and to directly transmit an input signal of the controller 200 to the server apparatus 300.

Figure 10:
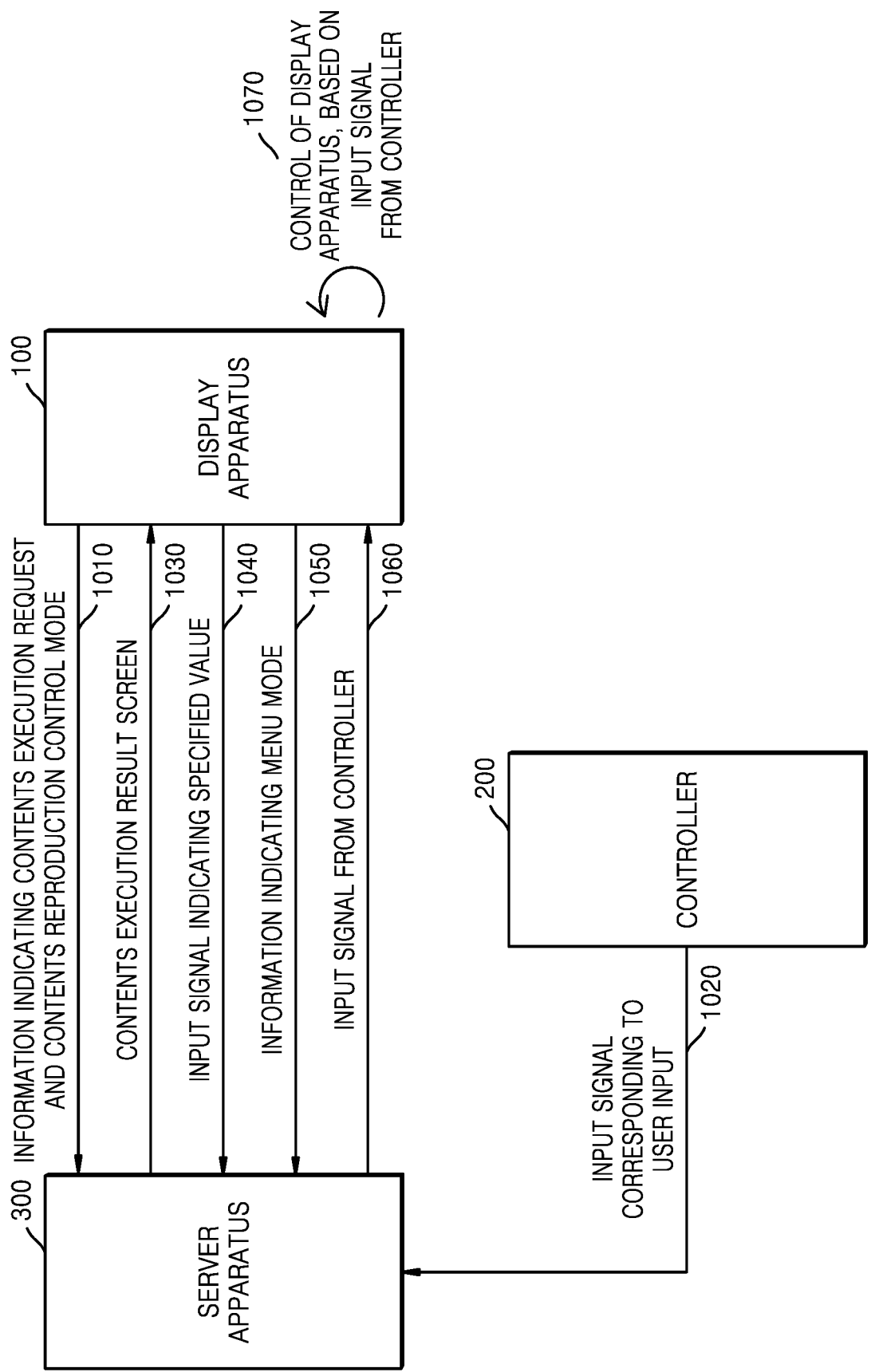
FIG. 10 illustrates an operation of a display apparatus in a menu mode receiving an input signal of a controller via a server apparatus, according to an embodiment.

FIG. 10 illustrates an operation of a display apparatus in a menu mode receives an input signal of a controller via a server apparatus, according to an embodiment.

Referring to FIG. 10, the display apparatus 100 may transmit, to the server apparatus 300, information 1010 indicating that the display apparatus 100 is in a contents reproduction control mode.

The controller 200 may transmit, to the server apparatus 300, an input signal 1020 corresponding to a user input.

The server apparatus 300 may identify whether the input signal received from the controller 200 indicates a specified value, and when it does not indicate the specified value, the server apparatus 300 may perform calculation for execution of an application by using the input signal from the controller 200 and may transmit a content execution result screen 1030 to the display apparatus 100.

When the input signal received from the controller 200 indicates the specified value, the server apparatus 300 may changelessly transmit an input signal 1040 indicating the specified value to the display apparatus 100.

When the display apparatus 100 receives the input signal indicating the specified value, the display apparatus 100 may output a user interface screen for control of the display apparatus 100, or may transmit information 1050 indicating that the display apparatus 100 is in a menu mode to the server apparatus 300. The server apparatus 300 may recognize that the display apparatus 100 is in the menu mode.

When the server apparatus 300 receives the input signal from the controller 200 while the display apparatus 100 is in the menu mode, the server apparatus 300 may changelessly transmit an input signal 1060 from the controller 200 to the display apparatus 100. The display apparatus 100 may control the display apparatus 100, based on the input signal from the controller 200. That is, the display apparatus 100 may convert the input signal from the controller 200 into a display apparatus control signal, and may perform an operation corresponding to the display apparatus control signal.

When the user interface screen for control of the display apparatus 100 is ended and then a contents application screen is positioned in a foreground layer of the display apparatus 100, the display apparatus 100 may identify that an end of the menu mode and a start of the contents reproduction control mode. In this case, the display apparatus 100 may transmit, to the server apparatus 300, information indicating the contents reproduction control mode.

In the example shown in FIG. 10 above, it is described that a mode controller input signal including a contents reproduction control mode or a menu mode is received by the display apparatus 100 via the server apparatus 300. Hereinafter, in FIG. 11, it is described that, in the contents reproduction control mode, a controller input signal is received by the display apparatus 100 via the server apparatus 300, but, in the menu mode, a controller input signal is directly transmitted to the display apparatus 100 without via the server apparatus 300.

Figure 11:
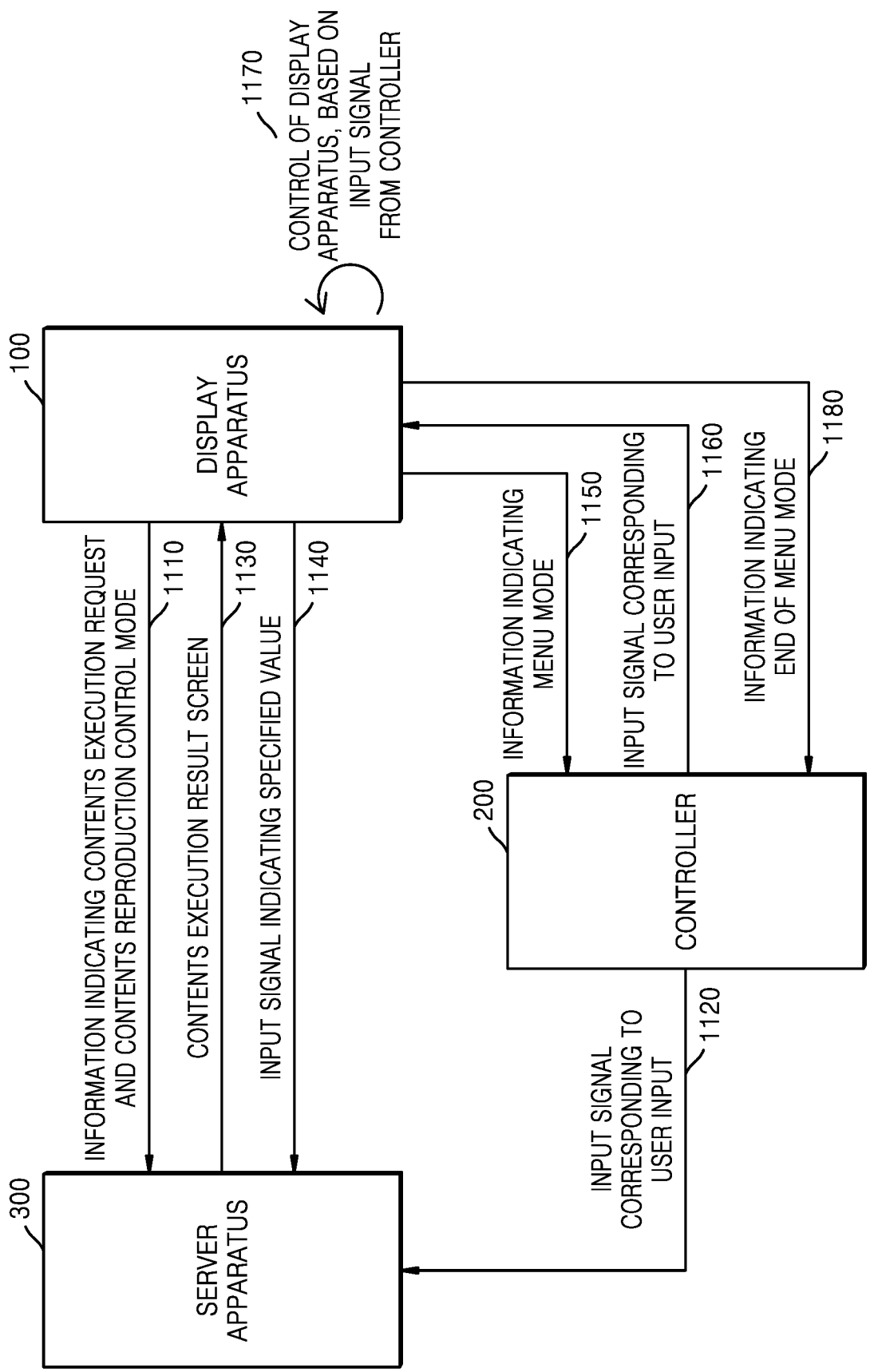
FIG. 11 illustrates an operation of a display apparatus in a menu mode receiving a controller input signal directly from a controller, according to an embodiment.

FIG. 11 illustrates an operation of a display apparatus in a menu mode receiving a controller input signal directly from a controller, according to an embodiment.

Referring to FIG. 11, the display apparatus 100 may transmit, to the server apparatus 300, information 1110 indicating that the display apparatus 100 is in a contents reproduction control mode.

The controller 200 may transmit, to the server apparatus 300, an input signal 1120 corresponding to a user input.

The server apparatus 300 may identify whether the input signal received from the controller 200 indicates a specified value, and when it does not indicate the specified value, the server apparatus 300 may perform calculation for execution of an application by using the input signal from the controller 200 and may transmit a content execution result screen 1130 to the display apparatus 100.

When the input signal received from the controller 200 indicates the specified value, the server apparatus 300 may changelessly transmit an input signal 1140 indicating the specified value to the display apparatus 100.

When the display apparatus 100 receives the input signal indicating the specified value, the display apparatus 100 may output a user interface screen for control of the display apparatus 100, or may transmit information 1150 indicating that the display apparatus 100 is in a menu mode to the controller 200. The controller 200 may recognize that the display apparatus 100 is in the menu mode.

The controller 200 may directly transmit, to the display apparatus 100, an input signal 1160 corresponding to a user input while the display apparatus 100 is in the menu mode.

When the display apparatus 100 receives the input signal of the controller 200 from the controller 200, the display apparatus 100 may control the display apparatus 100, based on the input signal of the controller 200. That is, the display apparatus 100 may convert the input signal from the controller 200 into a display apparatus control signal, and may perform an operation 1170 corresponding to the display apparatus control signal.

Afterward, when the user interface screen is disappeared according to a user input for ending the user interface screen and a contents application screen is displayed, the display apparatus 100 may recognize that the menu mode is ended and the contents reproduction control mode is started. Then, the display apparatus 100 may transmit, to the controller 200, information 1180 indicating the end of the menu mode so as to notify the end of the menu mode.

When the information 1180 indicating the end of the menu mode is received, the controller 200 may transmit, to the server apparatus 300, an input signal corresponding to a user input.

Figure 12:
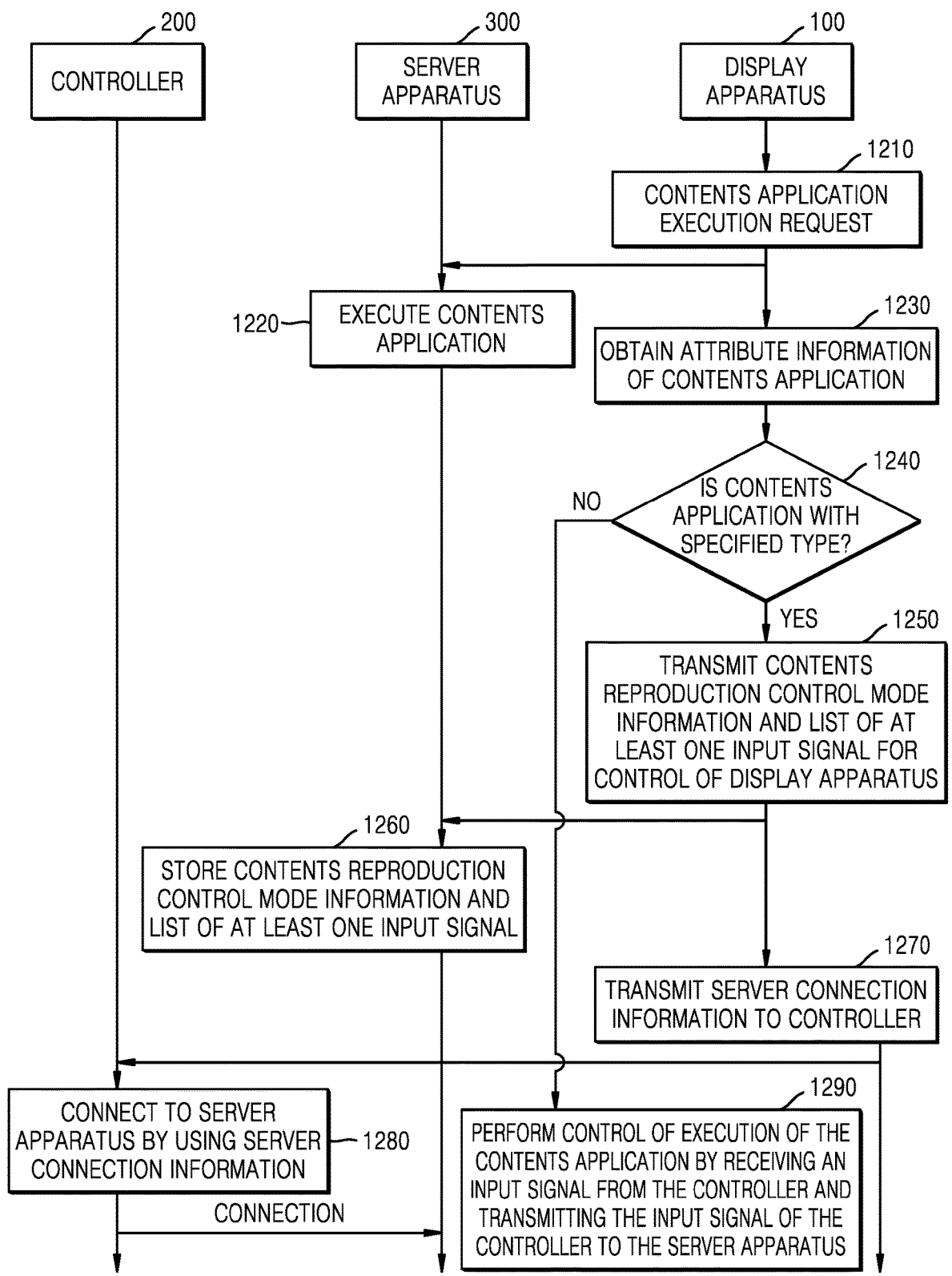
FIG. 12 illustrates a flowchart of an operating method of a controller, a server apparatus, and a display apparatus for connecting the controller to the server apparatus according to execution of content, according to an embodiment.

FIG. 12 illustrates a flowchart of an operating method of a controller, a server apparatus, and a display apparatus for connecting the controller to the server apparatus according to execution of content, according to an embodiment.

Referring to FIG. 12, in operation 1210, the display apparatus 100 may transmit a contents application execution request to the server apparatus 300. For example, the display apparatus 100 may display items for a start of execution of a contents application, and based on receiving a user input of selecting an item from among the displayed items, the display apparatus 100 may transmit, to the server apparatus 300, an execution request for a contents application corresponding to the selected item.

In operation 1220, the server apparatus 300 may execute the execution-requested contents application, according to the contents application execution request received from the display apparatus 100. The server apparatus 300 may transmit, to the display apparatus 100, a contents application screen output as a result of executing the contents application.

In operation 1230, the display apparatus 100 may obtain attribute information of the execution-requested contents application.

According to an embodiment, the display apparatus 100 may store the attribute information of the execution-requested contents application. For example, the display apparatus 100 may obtain attribute information of a contents application from meta information of the contents application. For example, the display apparatus 100 may have, as meta information about each application in an application database, a field as to whether each application is a server-controller direct connection type, and may store a value in the field when each application is installed or updated.

According to an embodiment, the display apparatus 100 may request the server apparatus 300 for attribute information of a contents application, may receive the attribute information from the server apparatus 300, and thus, may obtain the attribute information of the contents application.

The attribute information of the execution-requested contents application may include information whether the contents application is a server-controller direct connection type. A case where the contents application is the server-controller direct connection type may indicate that an input signal for controlling execution of the contents application may be directly transmitted from the controller to the server.

In operation 1240, the display apparatus 100 may determine whether the execution-requested contents application is a contents application with a specified type.

According to an embodiment, the display apparatus 100 may determine whether the execution-requested contents application is the server-controller direct connection type, as an example of the specified type.

According to an embodiment, the display apparatus 100 may obtain, from the meta information of the contents application, information about whether the execution-requested contents application is the server-controller direct connection type. The meta information of the contents application may be stored when the contents application is installed or updated in the display apparatus 100. Here, that an application is installed in the display apparatus 100 may indicate that a set of at least one instruction and items of data for an execution start of the application executable in the server is installed in the display apparatus 100.

According to an embodiment, the display apparatus 100 may obtain the information about whether the execution-requested contents application is the server-controller direct connection type, by requesting and receiving the information from the server apparatus 300.

In operation 1240, as a result of determining whether the execution-requested contents application is the contents application with the specified type, when the execution-requested contents application is not the contents application with the specified type, the operating method may proceed to operation 1290.

In operation 1290, the display apparatus 100 may perform control of execution of the contents application by receiving an input signal from the controller 200 and transmitting the input signal of the controller 200 to the server apparatus 300.

In operation 1240, as a result of determining whether the execution-requested contents application is the contents application with the specified type, when the execution-requested contents application is the contents application with the specified type, the operating method may proceed to operation 1250.

In operation 1250, the display apparatus 100 may transmit contents reproduction control mode information and a list of at least one input signal indicating a specified value.

According to an embodiment, the display apparatus 100 may transmit, to the server apparatus 300, the contents reproduction control mode information indicating that the display apparatus 100 is in a contents reproduction control mode.

According to an embodiment, the display apparatus 100 may transmit the list of at least one input signal indicating a specified value. The list of at least one input signal may include at least one input signal having a specified value for the server apparatus 300 to changelessly transmit, to the display apparatus 100, an input signal having a specified value when the input signal having the specified value is received from the controller 200. When it is determined that one input signal has a specified value, the display apparatus 100 may transmit an input signal list including one input signal having the specified value. For example, referring to FIG. 5, the input signal list may include <aaa1> as the input signal having the specified value.

In operation 1250, that the display apparatus 100 transmits the contents reproduction control mode information and the list of at least one input signal indicating the specified value does not indicate that they are always simultaneously transmitted, and thus, they may be simultaneously transmitted or may be transmitted in different times.

In operation 1260, the server apparatus 300 may store the contents reproduction control mode information and the list of at least one input signal indicating the specified value which are received from the display apparatus 100.

In operation 1270, according to a result of the determination in operation 1240, the execution-requested contents application is identified as the contents application with the specified type, e.g., the application of the server-controller direct connection type, and thus, in order for facilitate direct connection between the server and the controller, the display apparatus 100 may transmit, to the controller 200, information necessary for a server connection operation of the controller 200 and a server connection induction control command. The information necessary for the server connection operation may include access point connection information for the controller 200 to first connect to a wireless internet and server connection information for access to the server via the wireless internet. The access point connection information may include access point ID information and a password for connecting to an access point. The server connection information may include a URL of the server apparatus 300, a password for accessing the server apparatus 300, or the like. The server connection induction control command may indicate a control command for inducing the controller 200 to directly connect to the server apparatus 300 by using the access point connection information and the server connection information.

In operation 1280, the controller 200 may perform an operation of connecting to the server apparatus 300 by using the information necessary for the server connection operation which is received from the display apparatus 100.

According to an embodiment, the controller 200 may perform the operation of connecting to the server apparatus 300, according to the server connection induction control command received from the display apparatus 100. First, the controller 200 may connect to a wireless internet by using the access point connection information, and then may perform a connection operation on the server apparatus 300 by using the server connection information.

As illustrated in FIG. 12, after server-controller connection is completed with respect to the server-controller direct connection type of the application, the server apparatus 300 may directly receive an input signal from the controller 200 and may transmit, to the display apparatus 100, a result of executing the contents application according to the received input signal, during the contents reproduction control mode of the display apparatus 100. Also, during the menu mode of the display apparatus 100, the display apparatus 100 may receive an input signal for control of the display apparatus 100 via the server apparatus 300 or may directly receive the input signal from the controller 200. An example in which the display apparatus 100 receives a signal from the server apparatus 300 in both a contents reproduction control mode and a menu mode of the display apparatus 100 will be described with FIGS. 13 to 15, and an example in which the display apparatus 100 directly receives an input signal from the controller 200 in the menu mode of the display apparatus 100 will be described with FIGS. 16 to 18.

Figure 13:
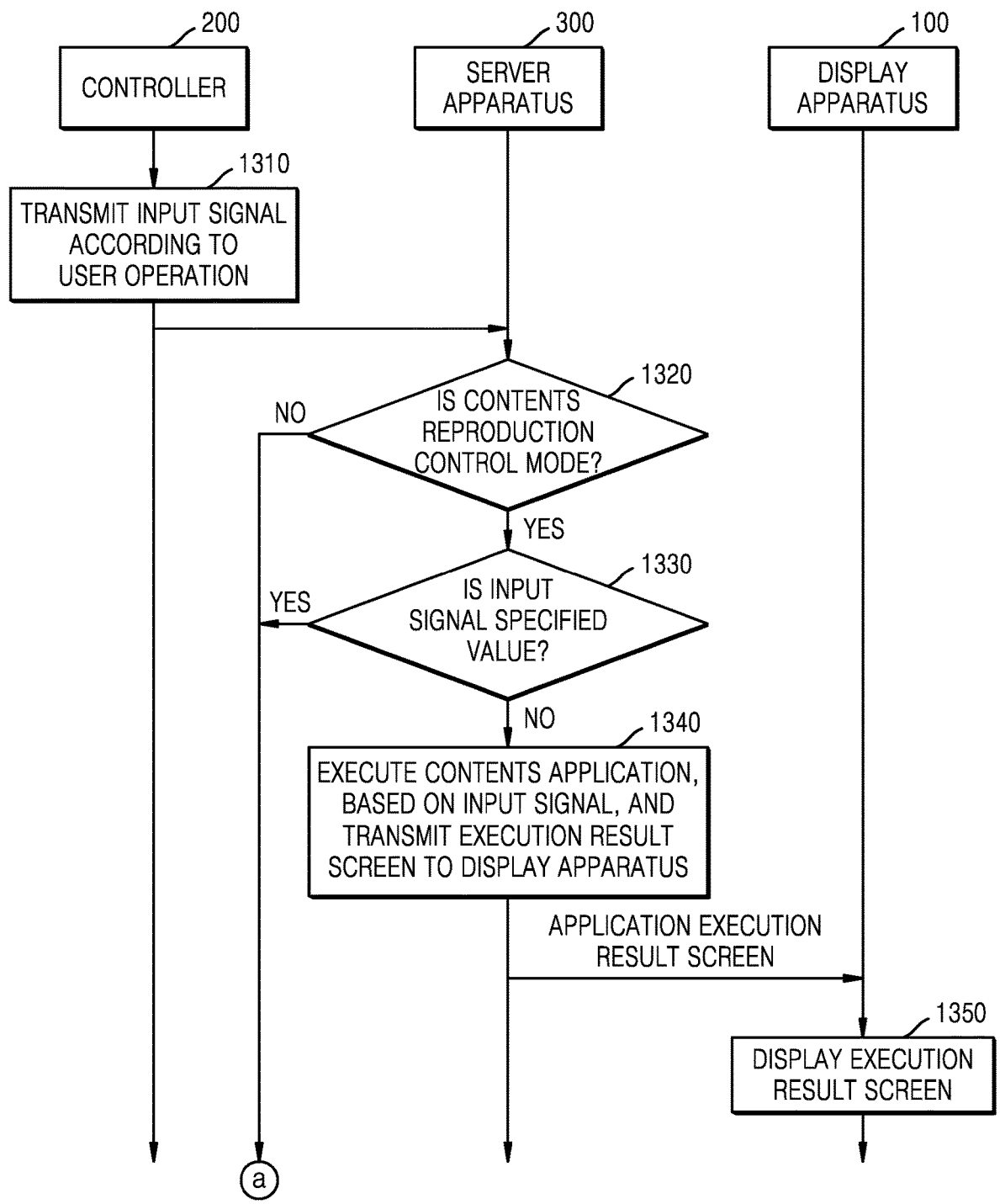
FIG. 13 illustrates a flowchart of an operating method of a controller, a server apparatus, and a display apparatus, according to an embodiment.

FIG. 13 illustrates a flowchart of an operating method of a controller, a server apparatus, and a display apparatus according to an embodiment.

Referring to FIG. 13, in operation 1310, the controller 200 may transmit, to the server apparatus 300, an input signal according to a user operation. While the display apparatus 100 displays application execution result content from the server apparatus 300, a user may operate the controller 200 to control execution of content displayed on the display apparatus 100. For example, the user may perform an operation input corresponding to a forward movement by using a button, a key or a dial provided at the controller 200 so as to manipulate a forward movement of a particular character in the content displayed on the display apparatus 100, and thus, the controller 200 may transmit, to the server apparatus 300, an input signal corresponding to the operation input.

In operation 1320, the server apparatus 300 may receive the input signal from the controller 200, and may determine whether the display apparatus 100 is in a contents reproduction control mode. The server apparatus 300 may previously receive, from the display apparatus 100, and store information indicating whether the display apparatus 100 is in the contents reproduction control mode. As a result of the determination, when the display apparatus 100 is not in the contents reproduction control mode, the operating method may proceed to ⓐ. As a result of the determination, when the display apparatus 100 is in the contents reproduction control mode, the operating method may proceed to operation 1330.

In operation 1330, the server apparatus 300 may determine whether the input signal indicates a specified value. The server apparatus 300 may receive, from the display apparatus 100, and store a list of at least one input signal indicating the specified value. When the input signal indicates the specified value, the operating method may proceed to ⓐ, and when the input signal does not indicate the specified value, the operating method may proceed to operation 1340.

In operation 1340, when the display apparatus 100 is in the contents reproduction control mode and the input signal does not indicate the specified value, the server apparatus 300 may execute a contents application, based on the input signal, and may transmit an execution result screen to the display apparatus 100.

In operation 1350, the display apparatus 100 may receive the execution result screen of the contents application from the server apparatus 300, and may display the received execution result screen. In the example above, for example, when the user operates the controller 200 so as to manipulate the forward movement of the particular character in the content displayed on the display apparatus 100, the execution result screen displayed on the display apparatus 100 may include an image in which the forward movement of the particular character has been performed.

Figure 14:
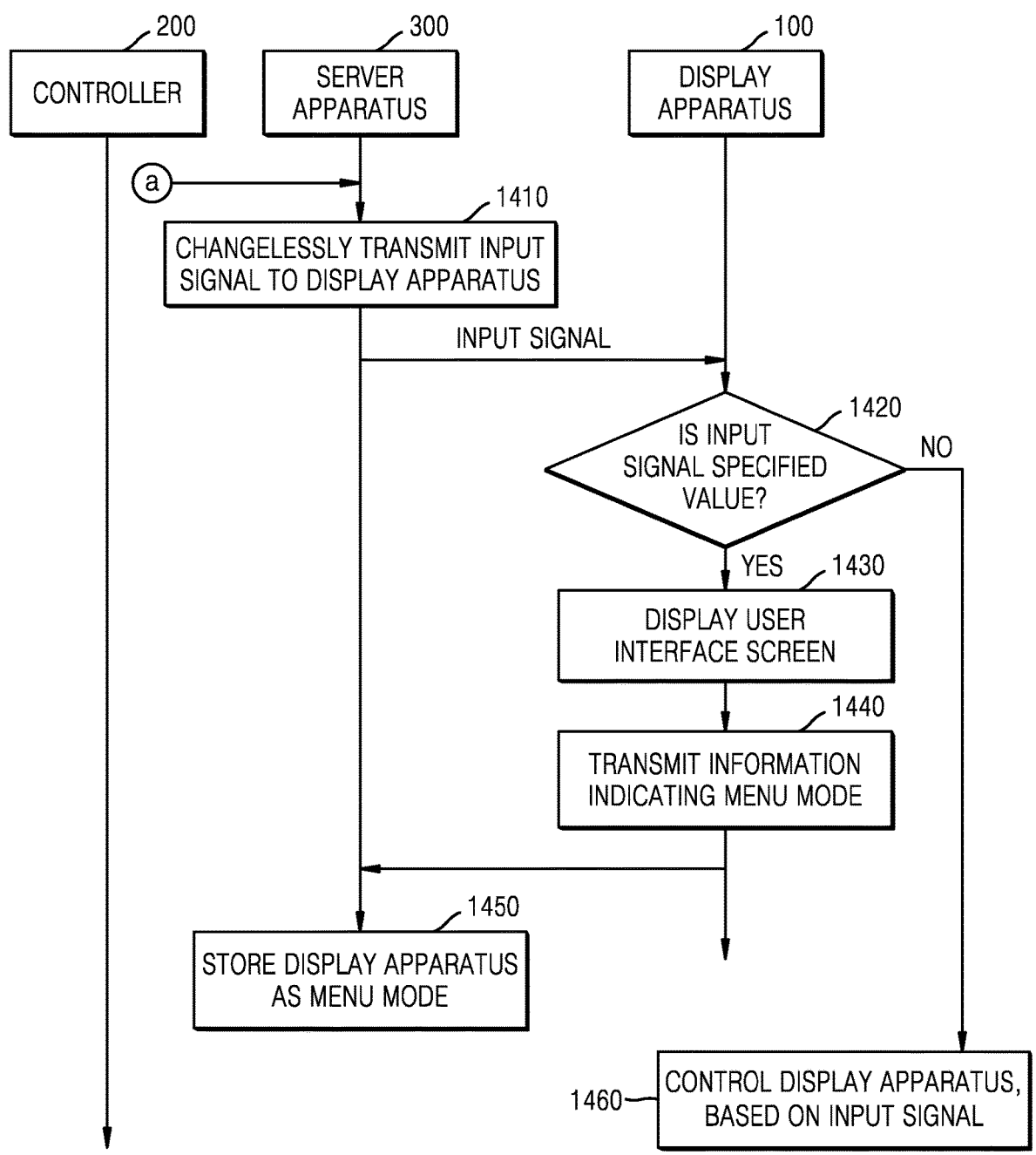
FIG. 14 illustrates a flowchart of an operating method of a controller, a server apparatus, and a display apparatus, according to an embodiment.

FIG. 14 illustrates a flowchart of an operating method of a controller, a server apparatus, and a display apparatus according to an embodiment.

When the display apparatus 100 is not in a contents reproduction control mode (e.g., "NO" at operation 1320) or an input signal indicates a specified value (e.g., "YES" at operation 1340), the operating method may proceed to ⓐ, and continue at operation 1410 in FIG. 14.

Referring to FIG. 14, in operation 1410, the server apparatus 300 may changelessly transmit an input signal of the controller 200 to the display apparatus 100. Two situations in which the operating method may proceed to ⓐ, e.g., a case where the display apparatus 100 is not in a contents reproduction control mode but is in a menu mode, an input signal of the controller 200 is changelessly transmitted to the display apparatus 100 so as to be used in control of the display apparatus 100, and also, in a case where the input signal indicates a specified value, the input signal of the controller 200 is changelessly transmitted to the display apparatus 100 so as to allow the display apparatus 100 to enter the menu mode.

In operation 1420, the display apparatus 100 may determine whether the input signal of the controller 200 received from the server apparatus 300 indicates a specified value. As a result of the determination, when the input signal of the controller 200 does not indicate the specified value, the operating method may proceed to operation 1460, and when the input signal indicates the specified value, the operating method may proceed to operation 1430.

In operation 1430, as the input signal of the controller 200 indicates the specified value, the display apparatus 100 may output a user interface screen for control of the display apparatus 100. For example, the user interface screen may include a quick panel, and the like.

In operation 1440, the display apparatus 100 may transmit, to the server apparatus 300, information indicating that an operation mode of the display apparatus 100 is a menu mode.

In operation 1450, the server apparatus 300 may receive the information from the display apparatus 100, and may store the information indicating that the display apparatus 100 is in the menu mode.

In operation 1460, the display apparatus 100 may perform a display apparatus control operation, based on the input signal. A case where the operating method proceeds to operation 1460 is a case where the input signal of the controller 200 is changelessly transmitted from the server apparatus 300 and the input signal does not indicate the specified value, the input signal may indicate that it is a signal for control of the display apparatus 100 in the menu mode. Therefore, the display apparatus 100 may convert the input signal of the controller 200 into a display apparatus control signal, and may perform an operation corresponding to the display apparatus control signal.

Figure 15:
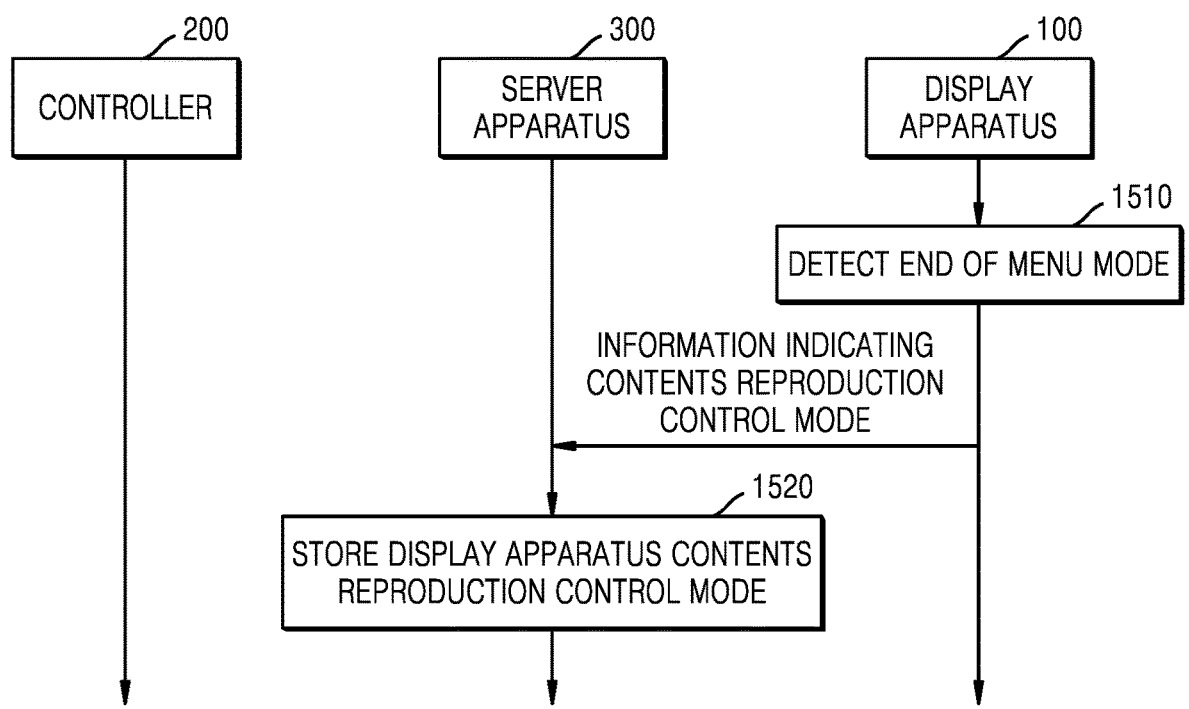
FIG. 15 illustrates a flowchart of an operating method of a controller, a server apparatus, and a display apparatus, according to an embodiment.

FIG. 15 illustrates a flowchart of an operating method of a controller, a server apparatus, and a display apparatus according to an embodiment.

Referring to FIG. 15, in operation 1510, the display apparatus 100 may detect an end of a menu mode. For example, when a screen for control of the display apparatus 100 is ended, e.g., a user interface screen is ended in response to a user input, the display apparatus 100 may detect the end of the menu mode. Also, the end of the menu mode may indicate a start of a contents reproduction control mode.

In operation 1520, the display apparatus 100 may transmit, to the server apparatus 300, information indicating that the display apparatus 100 is in the contents reproduction control mode.

In operation 1530, the server apparatus 300 may store the information indicating that the display apparatus 100 is in the contents reproduction control mode, the information being received from the display apparatus 100.

In a case where, after the server apparatus 300 stores the information indicating the contents reproduction control mode of the display apparatus 100, the server apparatus 300 receives an input signal from the controller 200, the server apparatus 300 may operate as shown in FIG. 13.

Figure 16:
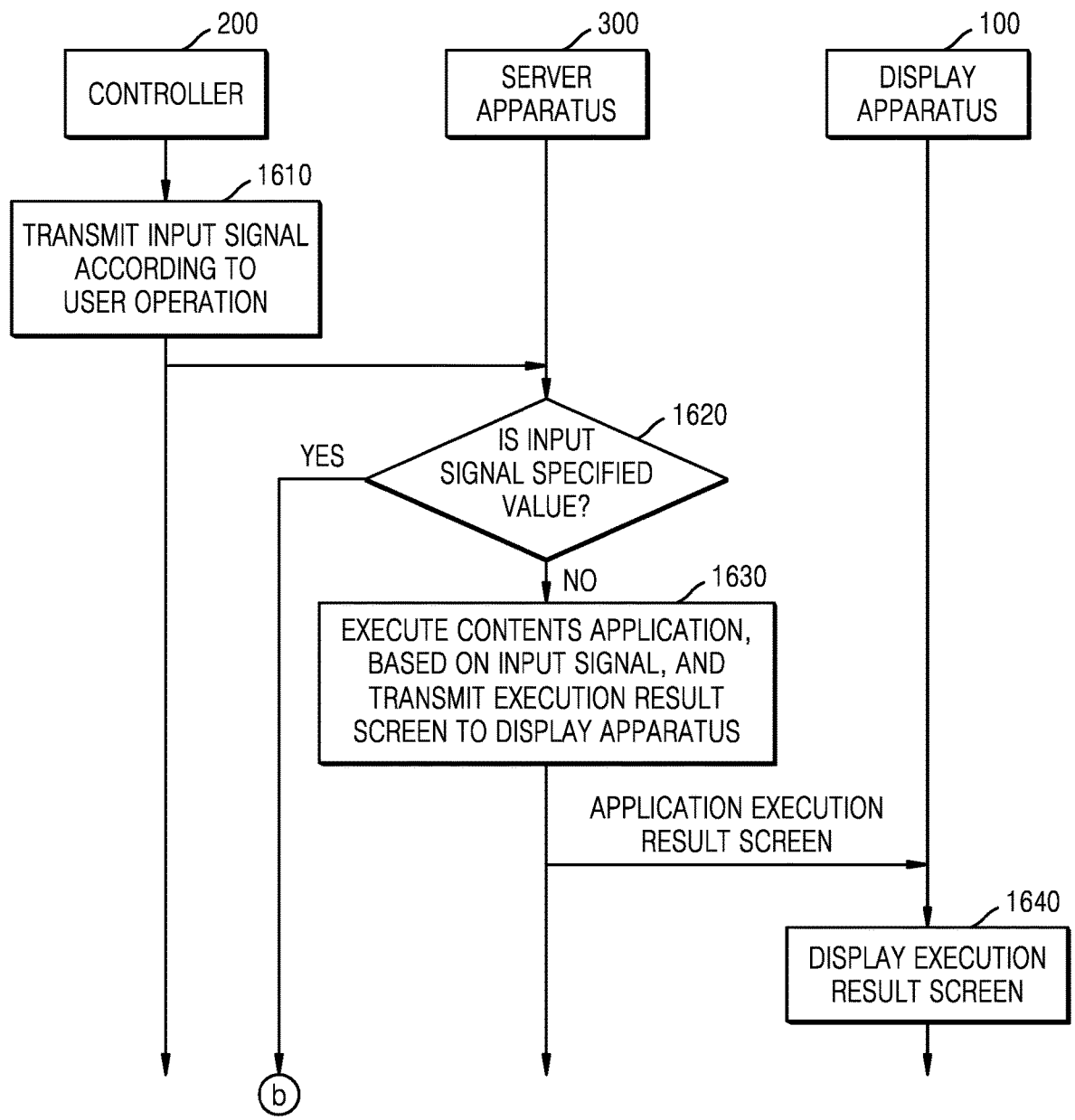
FIG. 16 illustrates a flowchart of an operating method of a controller, a server apparatus, and a display apparatus, according to an embodiment.

FIG. 16 illustrates a flowchart of an operating method of a controller, a server apparatus, and a display apparatus according to an embodiment.

Referring to FIG. 16, in operation 1610, the controller 200 may transmit, to the server apparatus 300, an input signal according to a user operation. While the display apparatus 100 displays content according to an application execution result from the server apparatus 300, a user may operate the controller 200 so as to control execution of the content displayed on the display apparatus 100. For example, the user may perform an operation input corresponding to a forward movement by using a button, a key or a dial provided at the controller 200 so as to manipulate a forward movement of a particular character in the content displayed on the display apparatus 100, and thus, the controller 200 may transmit, to the server apparatus 300, an input signal corresponding to the operation input.

In operation 1620, the server apparatus 300 may determine whether the input signal indicates a specified value. The server apparatus 300 may receive, from the display apparatus 100, and store a list of at least one input signal indicating the specified value. When the input signal indicates the specified value, the operating method may proceed to ⓑ, and when the input signal does not indicate the specified value, the operating method may proceed to operation 1630.

In operation 1630, when the input signal is not the specified value, the server apparatus 300 may execute a contents application, based on the input signal, and may transmit an execution result screen to the display apparatus 100.

In operation 1640, the display apparatus 100 may receive the execution result screen of the contents application from the server apparatus 300, and may display the received execution result screen. In the example above, for example, when the user operates the controller 200 so as to manipulate the forward movement of the particular character in the content displayed on the display apparatus 100, the execution result screen displayed on the display apparatus 100 may include an image in which the forward movement of the particular character has been performed.

Figure 17:
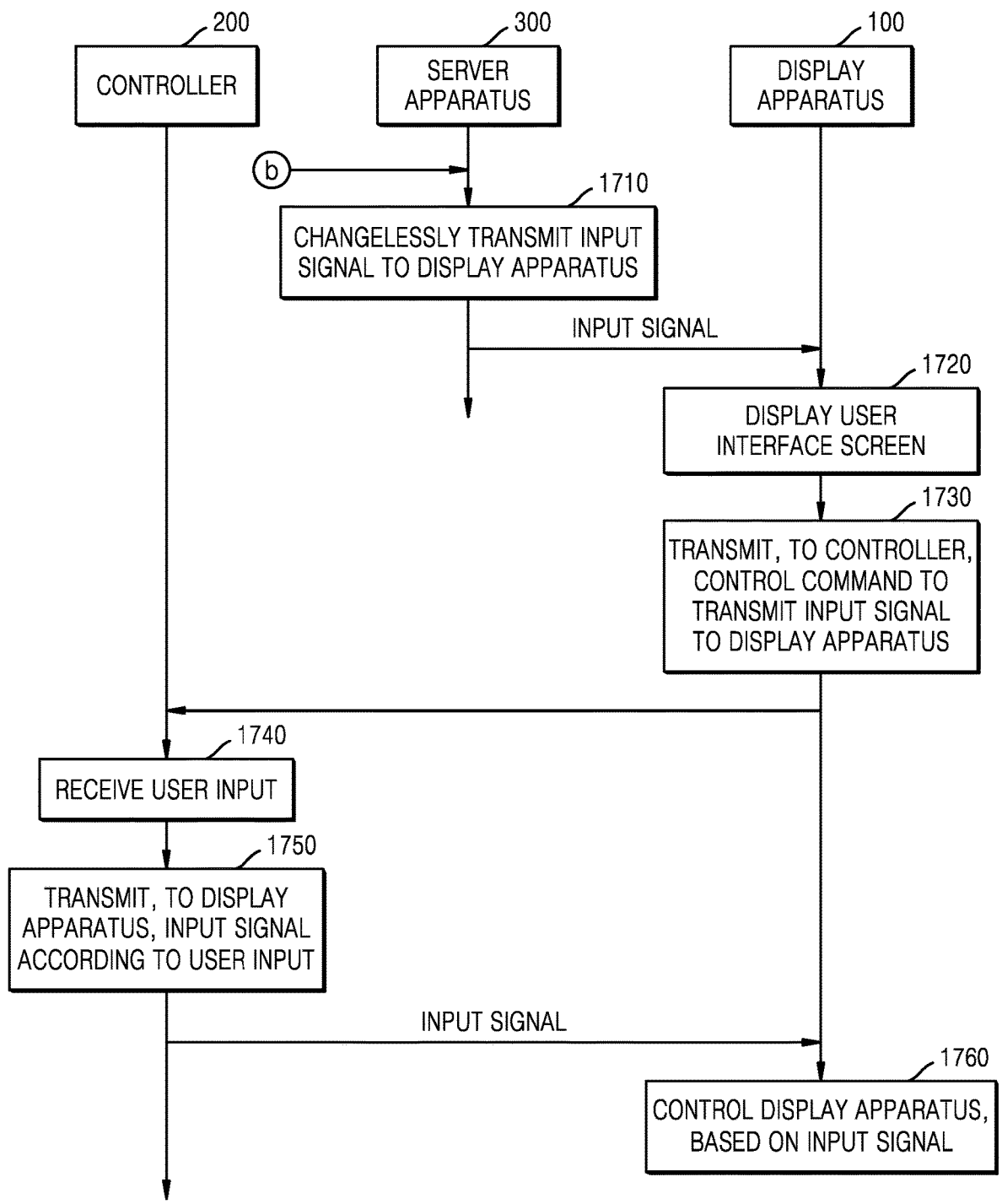
FIG. 17 illustrates a flowchart of an operating method of a controller, a server apparatus, and a display apparatus, according to an embodiment.

FIG. 17 illustrates a flowchart of an operating method of a controller, a server apparatus, and a display apparatus according to an embodiment.

When an input signal indicates the specified value (e.g., "YES" at operation 1620, "YES" at operation 1850), the operating method may proceed to (b), and continue at operation 1710 in FIG. 17.

Referring to FIG. 17, in operation 1710, the server apparatus 300 may changelessly transmit an input signal of the controller 200 to the display apparatus 100. In a situation in which the operating method may proceed to (b), e.g., a case where the input signal indicates the specified value, the input signal of the controller 200 is changelessly transmitted to the display apparatus 100 so as to allow the display apparatus 100 to enter a menu mode.

In operation 1720, the display apparatus 100 may output a user interface screen for control of the display apparatus 100, based on the input signal of the controller 200 indicating the specified value. For example, the user interface screen may include a quick panel, and the like.

In operation 1730, the display apparatus 100 may transmit, to the controller 200, a control command to transmit the input signal to the display apparatus 100. While the display apparatus 100 displays the user interface screen, e.g., during a menu mode of the display apparatus 100, the display apparatus 100 may transmit, to the controller 200, a control command indicating to transmit an input signal to the display apparatus 100 so as to directly receive the input signal for control of the display apparatus 100 from the controller 200 during the menu mode of the display apparatus 100. The control command may be transmitted to the controller 200 via a Bluetooth communication technology or a Wi-Fi communication technology.

In operation 1740, the controller 200 may receive the control command indicating to transmit the input signal to the display apparatus 100, and may transmit, to the display apparatus 100, an input signal according to a user input.

In operation 1750, the display apparatus 100 may directly receive an input signal for control of the user interface screen displayed on a display of the display apparatus 100 from the controller 200, instead of receiving the input signal via the server apparatus 300. Afterward, the display apparatus 100 may perform a control operation with respect to the display apparatus 100, based on the input signal.

Figure 18:
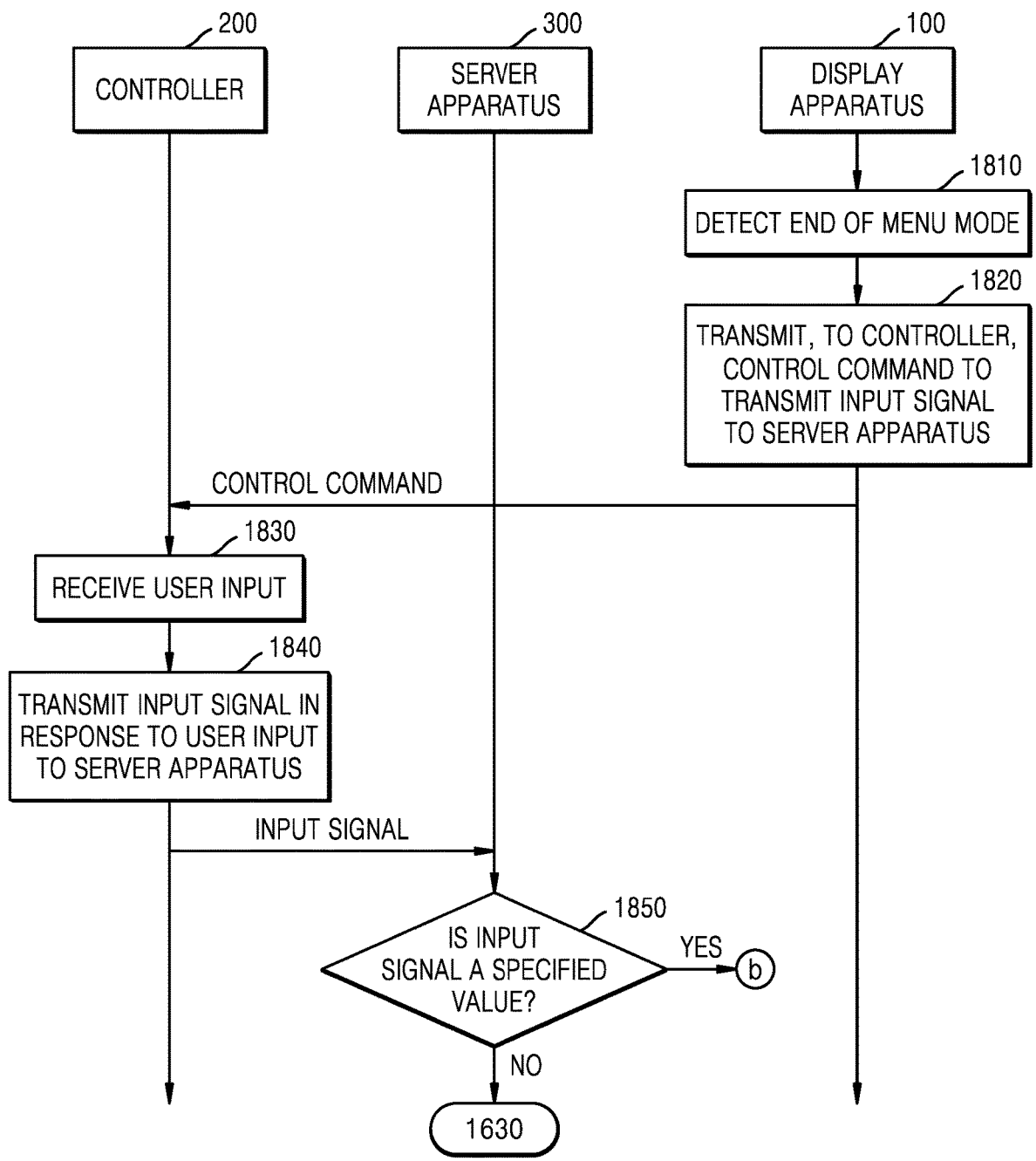
FIG. 18 illustrates a flowchart of an operating method of a controller, a server apparatus, and a display apparatus, according to an embodiment.

FIG. 18 illustrates a flowchart of an operating method of a controller, a server apparatus, and a display apparatus according to an embodiment.

Referring to FIG. 18, in operation 1810, the display apparatus 100 may detect an end of a menu mode. For example, the display apparatus 100 may detect the end of the menu mode when a screen for control of the display apparatus 100 is ended, e.g., an end of a user interface screen. Also, the end of the menu mode may indicate a start of a contents reproduction control mode.

In operation 1820, the display apparatus 100 may transmit, to the controller 200, a control command to transmit an input signal to the server apparatus 300. That is, as the menu mode of the display apparatus 100 is ended and the contents reproduction control mode is started, the display apparatus 100 allows the controller 200 to transmit the input signal to the server apparatus 300 so as to receive, from the server apparatus 300, a result screen according to reproduction control of content displayed on a display of the display apparatus 100.

In operation 1830, the controller 200 may receive the control command from the display apparatus 100 and then may receive a user input.

In operation 1840, the controller 200 may transmit an input signal in response to the user input to the server apparatus 300.

In operation 1850, the server apparatus 300 may determine whether the input signal received from the controller 200 indicates a specified value. When the input signal indicates the specified value, the operating method may proceed to a and when the input signal does not indicate the specified value, the operating method may proceed to operation 1630. Operations thereafter are the same as those in FIG. 16, and thus, further descriptions are not provided here.

The embodiments of the disclosure may be embodied as a computer-readable recording medium, e.g., a program module to be executed in computers, which includes computer-readable instructions. The computer-readable recording medium may include any usable medium that may be accessed by computers, volatile and non-volatile medium, and detachable and non-detachable medium. Also, the computer-readable recording medium may include a computer storage medium. The computer storage medium includes all volatile and non-volatile media, and detachable and non-detachable media which are technically implemented to store information including computer-readable instructions, data structures, program modules or other data.

The embodiments of the disclosure may be implemented in a software (S/W) program including instructions stored in a computer-readable storage medium.

The computer is a device capable of calling the stored instructions from the storage medium and operating according to the embodiments of the disclosure in accordance with the called instructions, and may include an electronic device according to the embodiments.

The computer-readable storage medium may be provided in the form of a non-transitory storage medium. Here, the term 'non-transitory' means that the storage medium is tangible and does not refer to a transitory electrical signal, but does not distinguish that data is stored semi-permanently or temporarily on the storage medium.

Furthermore, a control method according to the embodiments of the disclosure may be provided in a computer program product. The computer program product may be traded between a seller and a purchaser as a commodity.

The computer program product may include an S/W program and a computer-readable storage medium having stored therein the S/W program. For example, the computer program product may include a product (e.g. a downloadable application) in an S/W program distributed electronically through a manufacturer of an electronic device or an electronic market (e.g., Google Play Store and App Store). For electronic distribution, at least a part of the S/W program may be stored on the storage medium or may be generated temporarily. In this case, the storage medium may be a storage medium of a server of the manufacturer, a server of the electronic market, or a relay server for temporarily storing the S/W program.

The computer program product may include a storage medium of a server or a storage medium of an electronic device, in a system including the server and the electronic device. Alternatively, when there is a third device (e.g., a smartphone) that communicates with the server or the electronic device, the computer program product may include a storage medium of the third device. Alternatively, the computer program product may include an S/W program that is transmitted from the server to the electronic device or the third device or from the third device to the electronic device.

In this case, one of the server, the electronic device, and the third device may perform the method according to the embodiments of the disclosure by executing the computer program product. Alternatively, at least two of the server, the electronic device, and the third device may divide and perform the method according to the embodiments of the disclosure by executing the computer program product.

For example, the server (e.g., a cloud server, an AI server, or the like) may execute the computer program product stored in the server, thereby controlling the electronic device to perform the method according to the embodiments of the disclosure, the electronic device communicating with the server.

As another example, the third device may execute the computer program product, thereby controlling the electronic device to perform the method according to the embodiments of the disclosure, the electronic device communicating with the third device. When the third device executes the computer program product, the third device may download the computer program product from the server, and may execute the downloaded computer program product. Alternatively, the third device may perform the method according to the embodiments of the disclosure by executing a pre-loaded computer program product.

Throughout the specification, the term "unit" may indicate a hardware component such as a processor or a circuit, and/or may indicate a software component that is executed by a hardware configuration such as a processor.

While the disclosure has been particularly shown and described with reference to the accompanying drawings, in which embodiments of the disclosure are shown, it is obvious to one of ordinary skill in the art that the disclosure may be easily embodied in many different forms without changing the technical concept or essential features of the disclosure. Thus, it should be understood that the embodiments described herein should be considered in a descriptive sense only and not for purposes of limitation. For example, configuring elements that are singular forms may be executed in a distributed fashion, and also, configuring elements that are distributed may be combined and then executed.

While example embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims and their equivalents. Also, it is intended that such modifications are not to be interpreted independently from the technical idea or prospect of the disclosure.

What is claimed is:

1. A display apparatus comprising:
a communication interface;
a display;
at least one processor including processing circuitry; and
memory storing instructions that, when executed by the at least one processor individually or collectively, cause the display apparatus to:
receive, through the communication interface, from a server apparatus, a first execution result content obtained by executing a contents application based on a first input signal directly provided from an external device, when the first input signal does not correspond to a specified value,
control the display to display the first execution result content,
receive, through the communication interface, from the server apparatus, the first input signal directly provided to the server apparatus from the external device, when the first input signal corresponds to the specified value,
based on the first input signal corresponding to the specified value being received from the server apparatus, display, through the display, a user interface screen to control the display apparatus,
receive, through the communication interface while the display is displaying the user interface screen, a second input signal from the external device,
control the displayed user interface screen, based on the second input signal, and
perform an operation based on the control of the displayed user interface screen.

2. The display apparatus of claim 1, wherein the memory storing instructions that, when executed by the at least one processor individually or collectively, cause the display apparatus to:
receive, through the communication interface, the second input signal from the external device via the server apparatus, or
receive, through the communication interface, the second input signal directly from the external device.

3. The display apparatus of claim 1, wherein the memory storing instructions that, when executed by the at least one processor individually or collectively, cause the display apparatus to:
control the display to end displaying of the user interface screen, based on the second input signal indicating to end displaying of the user interface screen, and
control the communication interface to transmit, to the server apparatus, a signal indicating that the display apparatus is in a contents reproduction control mode, based on the display ending displaying of the user interface screen.

4. The display apparatus of claim 3, wherein the memory storing instructions that, when executed by the at least one processor individually or collectively, cause the display apparatus to:
receive, through the communication interface, from the server apparatus, a second execution result content obtained by executing the contents application according to a third input signal from the external device that is received after transmitting the signal indicating that the display apparatus is in the contents reproduction control mode.

5. The display apparatus of claim 1, wherein the memory storing instructions that, when executed by the at least one processor individually or collectively, cause the display apparatus to:
identify whether a type of the contents application is a specified type, and control the communication interface, to the server apparatus, a list comprising at least one input signal that indicates the specified value, based on the type of the contents application being the specified type.

6. The display apparatus of claim 1, wherein the memory storing instructions that, when executed by the at least one processor individually or collectively, cause the display apparatus to:
identify whether a type of the contents application is a specified type, and
based on the type of the contents application being the specified type, transmit, through the communication interface, to the external device, information to allow the external device to be directly connected to the server apparatus, and a command to the server apparatus.

7. A method of operating a display apparatus, the method comprising:
receiving, from a server apparatus, a first execution result content obtained by executing a contents application based on a first input signal directly provided from an external device, when the first input signal does not correspond to a specified value;
displaying the first execution result content on a display of the display apparatus;
receiving, from the server apparatus, the first input signal directly provided to the server apparatus from the external device, when the first input signal corresponds to the specified value;
based on the first input signal corresponding to the specified value being received from the server apparatus, displaying a user interface screen to control the display apparatus;
receiving while the display apparatus is displaying the user interface screen, a second input signal from the external device;
controlling the displayed user interface screen based on the second input signal; and
performing an operation based on the control of the displayed user interface screen.

8. The method of claim 7, wherein the receiving the second input signal from the external device comprises:
receiving the second input signal from the external device via the server apparatus; or
receiving the second input signal directly from the external device.

9. The method of claim 7, further comprising:
based on the second input signal indicating to end displaying of the user interface screen, controlling the display to end displaying of the user interface screen; and
transmitting, to the server apparatus, a signal indicating that the display apparatus is in a contents reproduction control mode, based on the display ending displaying of the user interface screen.

10. The method of claim 9, further comprising:
receiving, from the server apparatus, a second execution result content obtained by executing the contents application according to a third input signal from the external device that is received after transmitting the signal indicating that the display apparatus is in the contents reproduction control mode.

11. The method of claim 7, further comprising:
identifying whether a type of the contents application is a specified type; and
transmitting, to the server apparatus, a list comprising at least one input signal that indicates the specified value, based on the type of the contents application being the specified type.

12. The method of claim 7, further comprising:
identifying whether a type of the contents application is a specified type; and
based on the type of the contents application being the specified type, transmitting, to the external device, information to allow the external device to be directly connected to the server apparatus, and a command to instruct the external device to connect to the server apparatus.

13. A non-transitory computer readable medium for storing computer readable program code or instructions which are executable by at least one processor to perform a method of operating a display apparatus, the method comprising:
receiving, from a server apparatus, a first execution result content obtained by executing a contents application based on a first input signal directly provided from an external device, when the first input signal does not correspond to a specified value;
displaying the first execution result content on a display of the display apparatus;
receiving, from the server apparatus, the first input signal directly provided to the server apparatus from the external device, when the first input signal corresponds to the specified value;
based on the first input signal corresponding to the specified value being received from the server apparatus, displaying a user interface screen to control the display apparatus;
receiving while the display apparatus is displaying the user interface screen, a second input signal from the external device;
controlling the displayed user interface screen based on the second input signal; and
performing an operation based on the control of the displayed user interface screen.

\* \* \* \* \*